(12) United States Patent
Appanna et al.

(10) Patent No.: US 9,639,595 B2
(45) Date of Patent: May 2, 2017

(54) OPERATIONAL BUSINESS INTELLIGENCE SYSTEM AND METHOD

(71) Applicant: OpsVeda, inc., Sunnyvale, CA (US)

(72) Inventors: Venkatesh Appanna, Cupertino, CA (US); Sanjiv Gupta, San Jose, CA (US); Dinesh Somani, San Jose, CA (US)

(73) Assignee: Opsveda, Inc., Sunnyvale, CA (US)

( * ) Notice: Subject to any disclaimer, the term of this patent is extended or adjusted under 35 U.S.C. 154(b) by 442 days.

(21) Appl. No.: 14/328,123

(22) Filed: Jul. 10, 2014

(65) Prior Publication Data
US 2015/0019475 A1    Jan. 15, 2015

Related U.S. Application Data

(60) Provisional application No. 61/845,916, filed on Jul. 12, 2013.

(51) Int. Cl.
G06F 17/30    (2006.01)
(52) U.S. Cl.
CPC ............... *G06F 17/30592* (2013.01)
(58) Field of Classification Search
CPC ......... G06F 17/30592; G06F 17/30312; G06F 17/30386; G06F 17/30572
USPC ....................................................... 707/600
See application file for complete search history.

(56) References Cited

U.S. PATENT DOCUMENTS

| | | | |
|---|---|---|---|
| 6,965,886 B2 * | 11/2005 | Govrin | G06F 17/30592 706/45 |
| 7,647,250 B2 | 1/2010 | Abo-Hasna | |
| 8,001,185 B2 * | 8/2011 | Nicholls | G06Q 10/06311 705/7.13 |
| 8,165,993 B2 * | 4/2012 | Broda | G06F 17/3056 707/634 |

(Continued)

FOREIGN PATENT DOCUMENTS

| | | |
|---|---|---|
| WO | 03098517 A1 | 11/2003 |
| WO | 03102845 A2 | 12/2003 |

OTHER PUBLICATIONS

SAP HANA(tm) for Next-Generation Business Applications and Real-Time Analytics, 50 110 843 (Dec. 1, 2011).

*Primary Examiner* — Sheree Brown
(74) *Attorney, Agent, or Firm* — Stephen E. Zweig

(57) ABSTRACT

An automated method of detecting and reporting exceptions to a plurality of real-world processes, designed to combine the real-time speeds of automated transaction processing systems with the in depth analysis of automated business intelligence systems. The system operates by storing input data in the form of process agnostic database system (PADS) objects, configured to accept data without limitation as to specific process, and design to allow flexible automated linking between various things, activities, and processes to any desired depth. The system operates by analyzing real-time input data against various exception criteria, thereby determining exception marked objects, and then using linkages between different PADS objects to immediately determine the impact of these exceptions on other activities and processes. The system can then estimate the severity of the impact, automatically notify users when an impact to even distantly connected processes are detected, and also estimate the severity of the impact.

23 Claims, 16 Drawing Sheets

(56) References Cited

U.S. PATENT DOCUMENTS

| | | | |
|---|---|---|---|
| 8,468,177 B2* | 6/2013 | Reeves | G06F 17/30592 |
| | | | 707/802 |
| 2003/0084053 A1* | 5/2003 | Govrin | G06F 17/30592 |
| 2007/0021992 A1* | 1/2007 | Konakalla | G06Q 10/04 |
| | | | 705/7.28 |
| 2010/0251264 A1 | 9/2010 | McGuire | |
| 2012/0124584 A1 | 5/2012 | Addala | |
| 2012/0185425 A1* | 7/2012 | Reeves | G06F 17/30592 |
| | | | 707/600 |
| 2014/0018951 A1* | 1/2014 | Linton | G06N 5/02 |
| | | | 700/105 |

* cited by examiner

Figure 4

OBJECT HEADER 300.0

HDR-SERIAL-1, ...
HDR-SERIAL-2,...
HDR-SERIAL-3,...

OBJECT IDENTIFIERS 300.1

HDR-SERIAL-1, MATGROUP1, MG1, ...
HDR-SERIAL-1, MATERIAL, M-11, ...
HDR-SERIAL-2, MATERIAL, M-12, ...
HDR-SERIAL-3, MATERIAL, M-12, ...
HDR-SERIAL-3, PLANT, SFO-1, ...

OBJECT When-Where 300.3

WW-SERIAL-1, MATERIAL, M-12, On-Hold, ...

Find All Object Identifiers 300.1 records with given Identifier name (MATERIAL) and value (M-12)

OBJECT IDENTIFIERS 300.1

HDR-SERIAL-1, MATGROUP1, MG1, ...
HDR-SERIAL-1, MATERIAL, M-11, ...
HDR-SERIAL-2, MATERIAL, M-12, ...
HDR-SERIAL-3, MATERIAL, M-12, ...
HDR-SERIAL-3, PLANT, SFO-1, ...

Thus, find All Object Headers 300.0 SERIAL NUMBER (PK) that are related to the Activity. This is used as linking key to all other objects

OBJECT HEADER 300.0

HDR-SERIAL-1, ...
HDR-SERIAL-2,...
HDR-SERIAL-3,...

OPERATIONAL BUSINESS INTELLIGENCE SYSTEM AND METHOD

CROSS REFERENCE TO RELATED APPLICATIONS

This application claims the priority benefit of U.S. provisional patent application 61/845,916 "Operational Business Intelligence System and Method", filed Jul. 12, 2013, inventors Venkatesh Appanna and Sanjiv Gupta; the entire contents of which are incorporated herein by reference.

BACKGROUND OF THE INVENTION

Field of the Invention

This invention is in the field of computerized systems and methods for managing complex processes, such as complex business processes.

Description of the Related Art

Modern corporations and other organizations are often highly complex entities. These organizations often carry out a variety of different processes (e.g. business processes) that may require input from different departments or divisions (e.g. sales, purchasing, planning, manufacturing, finance, etc.). Indeed business organizations often operate in a global marketplace. Such organizations have a need to process a huge amount of operational data, often on an around the clock basis, and often attempt to meet these needs using various automated systems, often referred to as online transaction processing (OLTP) type systems.

Additionally, modern management techniques have found that it is important to have a high degree of operational and process level co-operation between various groups, such as buyers and sellers. However along with such high level of cooperation comes a heightened susceptibility to economic, political and environmental disruptions. Here various types of online analytical processing systems (OLAP) systems have been developed to analyze data according to multiple perspectives.

It has become increasingly important to react quickly to changes, and not be hindered by problems with data flow and management across internal business process boundaries or silos. Here, however, there is a problem because prior art OLTP systems typically do not interact well, if at all, with prior art OLAP systems.

To meet these needs various prior art enterprise resource planning (ERP) computer systems and software applications have been developed by companies such as SAP AG, Oracle, IBM, and the like. These vendors, often assisted by various third-party application packages typically provide computer application software suites intended to serve the needs of these various organizational departments and divisions for business processing and other purposes. However these prior art solutions tend to be inflexible and difficult and expensive to implement.

A new class of OLAP type business intelligence (BI) applications, typified by software vendors such as Tableau, QlikView, Birst, and the like have attempted to address some of the shortcomings of traditional BI tools by offering "self-service". With these tools the business user directly imports the operational data into the tool and runs their own reporting and analysis. Nonetheless there remains a need for further improvements in business intelligence art.

In general, particularly for business applications, prior art database approaches can be considered to be either online transaction processing (OLTP) databases, or online analytic processing databases (OLAP). The former are often used for more routine operational use, and can operate very quickly, such as on a real-time basis. By contrast the later, such as Business Intelligence (BI), are often used more by managers and executives for longer term planning purposes and are not intended for rapid operation. The two types of databases are generally quite incompatible, thus keeping organizational data into different silos, and making organizational management inefficient.

For both such systems, computing times can be improved by use of various in-memory computing techniques. These are represented by the SAP HANA system, which is described in the 2011 white paper: 50 110 843 (12/01) "*SAP HANA™ for Next-Generation Business Applications and Real-Time Analytics*".

Prior work these areas also includes Abo-Hasna (U.S. Pat. No. 7,647,250), Addala (US patent publication 20120124584), Beckett (PCT/US2003/016967), McGuire (US patent application 20100251264), and Audimoolam (PCT/US2003/015538).

BRIEF SUMMARY OF THE INVENTION

The invention is based, in part, on the insight that it would be useful to develop improved data structures and methods that would allow a single database to simultaneously implement both online transaction processing (OLAP) and online analytic processing (OLTP). In particular, the present invention is based on the insight that it would be useful to provide a system that can take online transaction processing data (OLTP type data), and determine the impact of such data at a higher business level of analysis (e.g. give a OLAP level of understanding), at real time speeds, or close to real time speeds as new data becomes available.

Although the various systems and methods described herein can be used by many different types of organizations for many different purposes, these systems and methods can be particularly useful for helping businesses manage complex business processes across multiple locations, vendors, and customers. Thus many of the examples disclosed herein are focused on business, such as large businesses, which may span different countries, as well as their various business goods (e.g. items for sale, raw materials), services, and their various business activities and processes.

In some embodiments, the systems and methods disclosed herein can be used to assess the impact of internal events, external events and anticipated but missing events (e.g. various types of exceptions) on various business processes and transactions. The impact can be determined in real-time, and can be based on rules that can be updated as business needs change.

As previously discussed, the invention is based, in part, on the insight that present business OLAP like intelligence (BI) systems have various limitations, such as slow speed, and general lack of responsiveness to data obtained from online transaction processing (OLTP) systems. It is thus desirable to produce an improved system that can help overcome these limitations. These limitations include general needs for data models that are designed for specific business processes, as well as general requirements for data analysis tools that often require expensive customization and programming in order to operate efficiently.

Thus prior art systems that were optimized for transaction processing (e.g. high speed OLTP systems) were often not well suited for end-to-end operational reporting, and vice versa. That is, prior art end-to-end operational (OLAP) data models often did not automatically react to changes in upstream events, and often failed to integrate data from external events at all.

These prior art end-to end operational data systems tended to operate on more of a "take-a-snapshot-and-analyze" type basis, in which data tended to be analyzed in batches depending on system schedules, rather than external events. Thus prior art end-to-end operational data systems tended to suffer from relatively slow (not real-time) processing speeds, and often required a substantial amount of time to react to events.

The invention is thus based, in part, on the insight that it would be desirable to produce an improved business intelligence system that could incorporate the high speeds of transaction processing (OLTP) with the deep insights that can come from end-to-end operational reporting (OLAP).

The invention is further based, in part, on the insight that due to advances in computing technology, methods of analyzing vast data stores in certain formats, such as columnar databases, are now feasible. This is due to techniques such as query parallelization and in-memory computing.

The invention is further based, in part, on the insight that these advances in computing technology can thus be used to produce an improved business intelligence system that is both "fast", can make use of useful transaction processing data, and yet at the same time can produce deep insights into the impact of various exceptions on various business processes.

To do this, in one embodiment of the present invention, the system ingests current business process objects and activities, in real time, into a process-agnostic data store (PADS) and analyzes the events as they occur or fail to occur. Thus the system helps recognize anomalies and exceptions, and also recognizes patterns in current and past process execution data, monitors Key Performance Indicators (KPIs) and trends thereof. The system can use these methods to predict impending business issues on a continuous basis.

In a typical enterprise system landscape, the OLTP type input data stream never stops. The data may be streamed in from the business' own or the business partners' systems that may span the globe and operate around the clock.

The invention makes use of this data. The invention takes the raw business data as it streams in, parses it, and incorporates it into the invention's unique process-agnostic data store (PADS) on a continuous basis. However unlike prior art OLTP systems, the invention immediately then performs a deeper OLAP type analysis to determine the broader business impact of this data. The invention thus overcomes a critical shortcoming of prior art "take-a-snapshot-and-analyze" type BI (OLAP) methods. The invention reacts quickly (in real time as data from various events are received), yet also, again on a real-time basis, can perform a deep and comprehensive (OLAP type) analysis of the impact of such events on even remotely connected business processes.

The invention is also based, in part, on the insight that such objectives can be facilitated by using a computerized method and system that automatically analyzes the impact of new data immediately as it arrives. In particular, it is useful to adopt a computer processor and software mediated processing scheme that may have two distinct parts.

The first part may use various criteria to automatically analyze the input data (often for various goods (e.g. things) and activities) as the data is received. This analysis includes determining linkages (if any) between the various goods (things) and activities described by the input data, and other goods (things), activities and processes that the organization wishes to monitor. This analyzed data is then immediately stored as one or more computer memory objects ("objects") in the invention's unique process agnostic data store (PADS) database.

The second part is then, preferably as rapidly as possible, and preferably in real-time or as close to real time as possible, automatically determine if there are any exceptions or abnormalities regarding the various goods (things) and activities in the input data, and if so use the linkages between the goods (things) and activities described by the input data, and other goods (things), activities, and processes that the organization wishes to monitor, and various rules to (again in real time or close to real time) estimate the impact these exceptions have on other processes. There is no limitation as to the depth of the analysis, or how large or complex the process may be.

Thus, for example, if incoming data indicates that a supplier or customer has just gone into chapter 7 bankruptcy, the system can immediately and automatically determine what specific processes may be effected (e.g. which payments to put on hold, for which products to initiate alternative sourcing activities, which products to put on back order, etc.). As another example, if incoming data indicates that a particular product (thing) has experienced shipping delays due to bad weather, the system can both immediately determine the impact on various business processes, and also use a historical database of shipping delays to estimate how long the various business processes are likely to be influenced by this delay.

Figure 3:
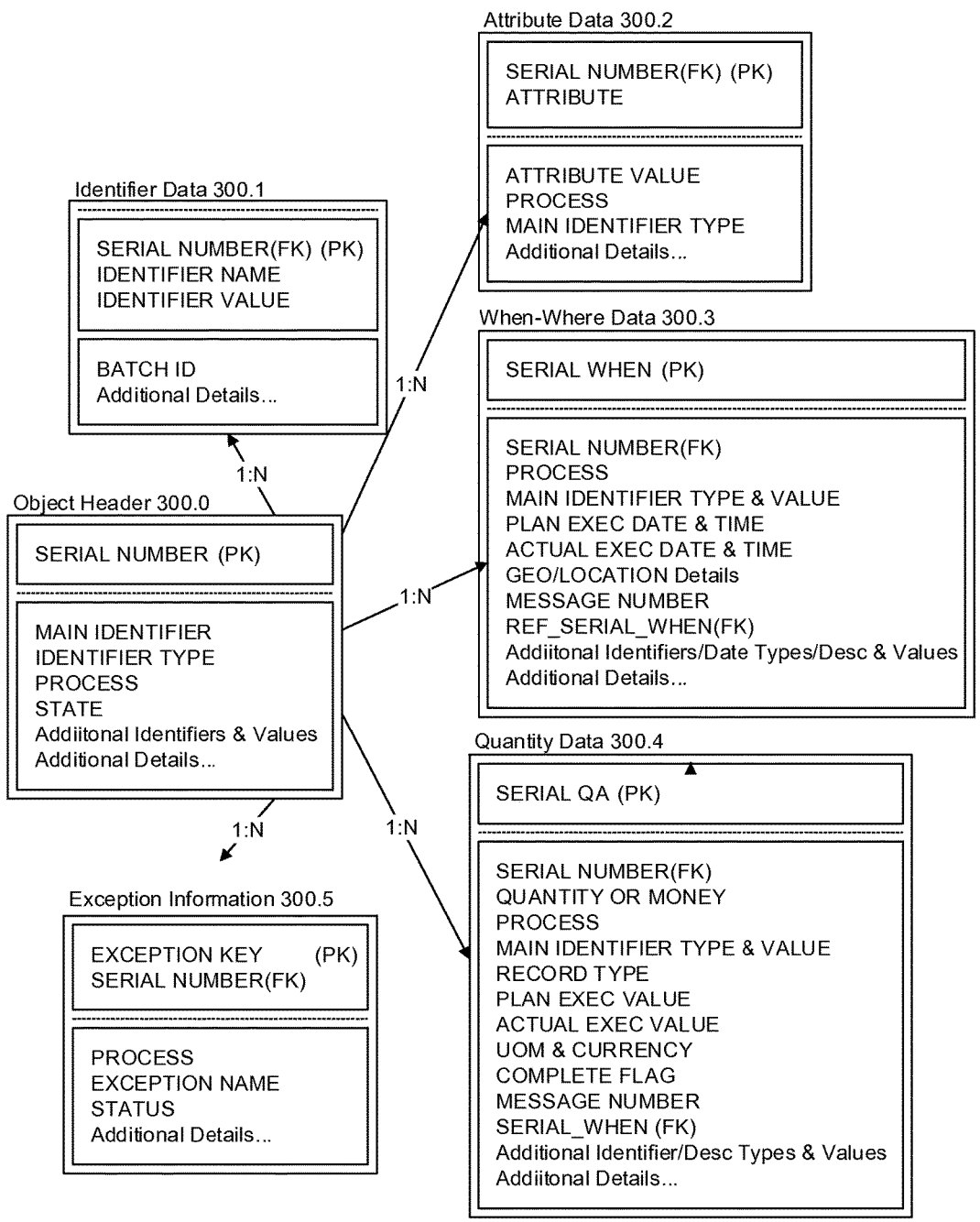
FIG. 3 shows a more detailed view of the logical links and data fields of a PADS database object. This scheme allows various business things and activities to be decomposed into values such as time and place (what-where), quantity, identifiers (useful for linking to other objects), and various attributes. In a preferred embodiment, the system also stores exception data in the PADS database object at the time that the object is initially created.

Note that these data fields are often referred to in the alternative as data tables or simply "tables". Here both "field" and "table" refer to data that is stored in specific portions of the PADS database object memory structure as shown in FIG. 3. Thus, for example, the "Object Header" table or "Object Header field" both refer to data stored in the memory structure of the Object Header 300.0 portion of the PADS database object shown in FIG. 3.

FIG. 4 shows one method of how the system can use PADS data to link various "things" (stored as PADS database objects) to various activities (also stored as PADS database objects).

Figure 5:
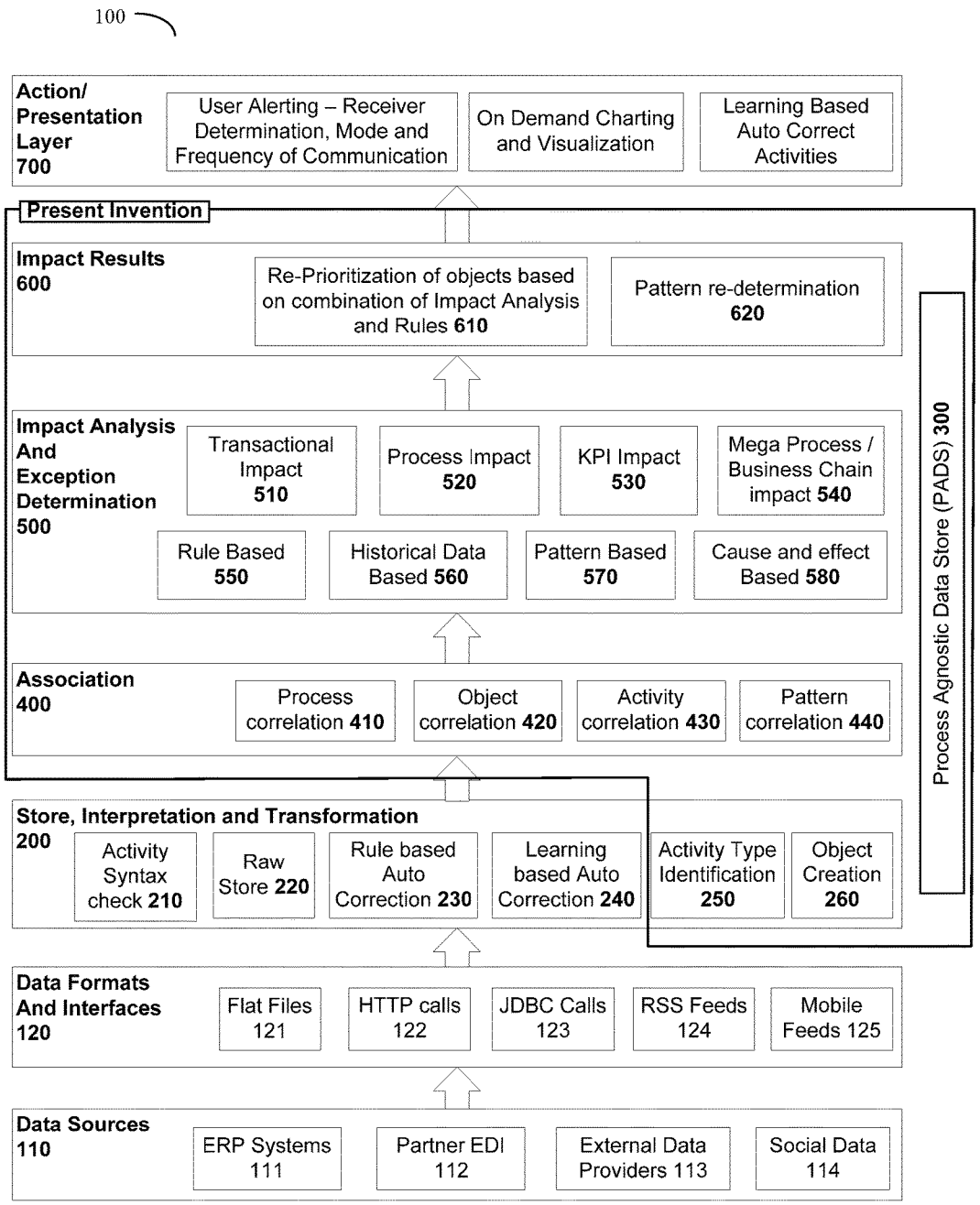

FIG. 5 shows a more detailed block diagram of some of the major software components of the present invention's system and method.

Figure 6:
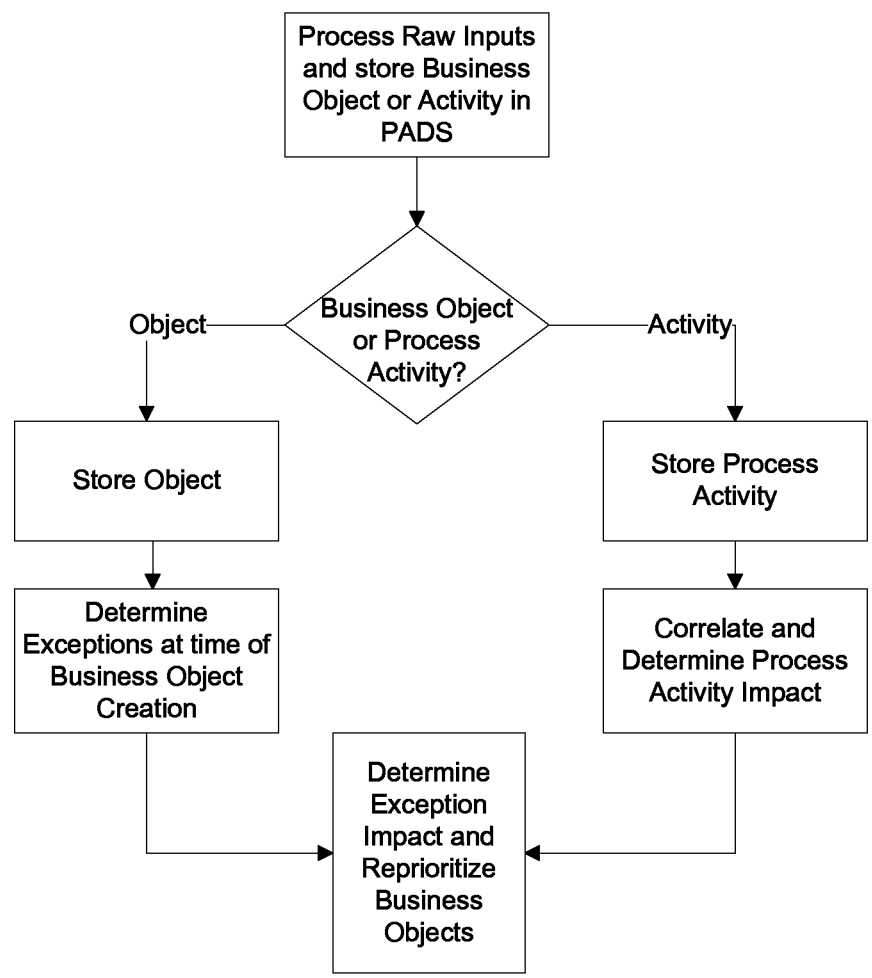

FIG. 6 shows a software flow chart giving a high level view of the how the invention operates. Raw data is parsed, transformed, interpreted, identified as a new business object (e.g. a new sales order or a manufacturing order for one or more "things" or products) or alternatively as a process activity on an existing business object (e.g. a material or "thing" temporarily placed on hold). The data is automatically checked and auto-corrected (to the extent possible) and then stored in the PADS database.

Figure 7:
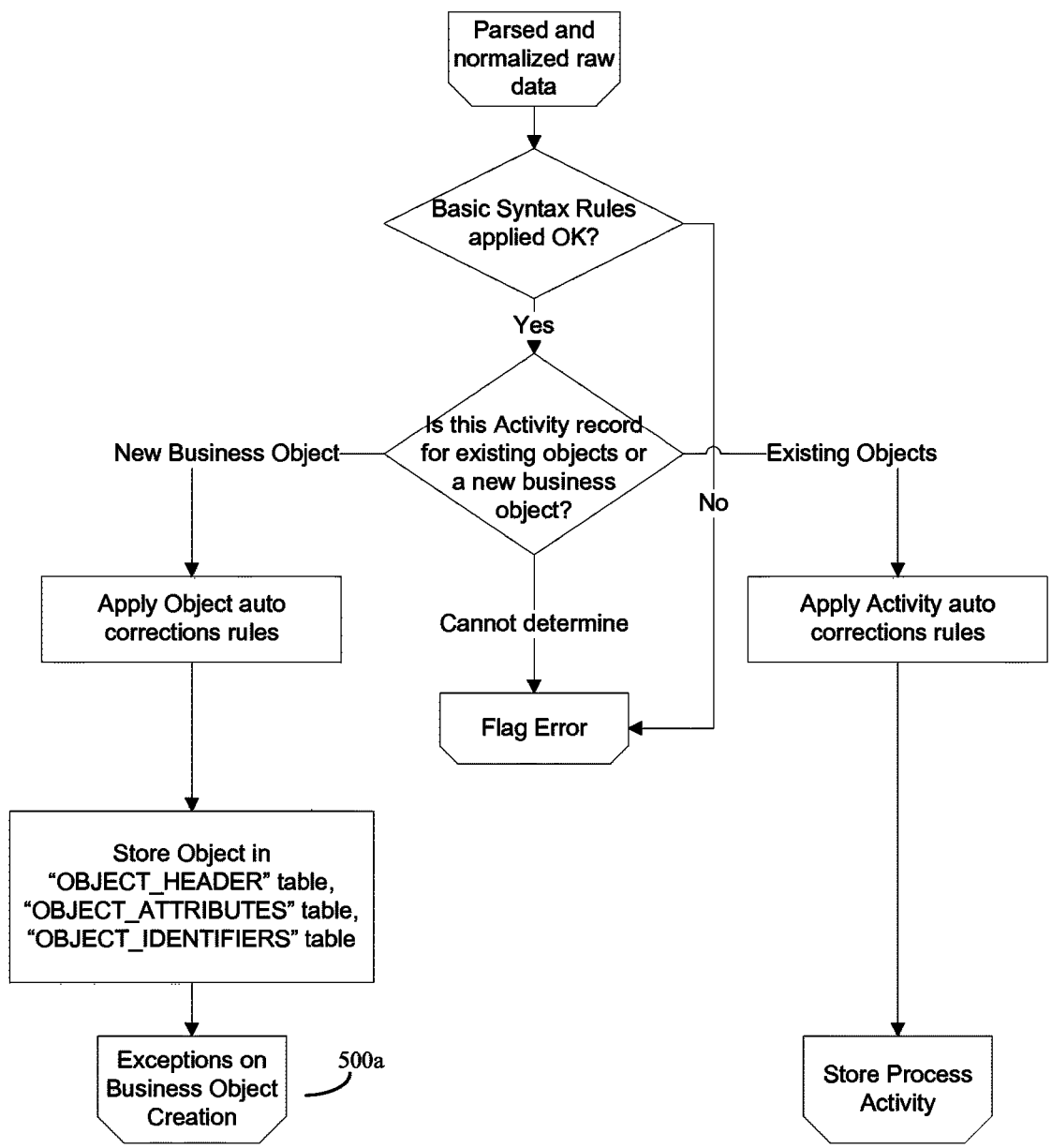

FIG. 7 shows a software flow chart showing how raw data (often obtained from external computerized devices via a network connection) can be parsed, processed, and stored as various PADS objects and processes. The input is parsed into various PADS object tables or fields such as the Object Header table or field (300.0), Attribute Data table or field (300.2) and various Identifier Data tables or fields (e.g. 300.1), and the resulting PADS database object is stored in the PADS database.

Figure 8:
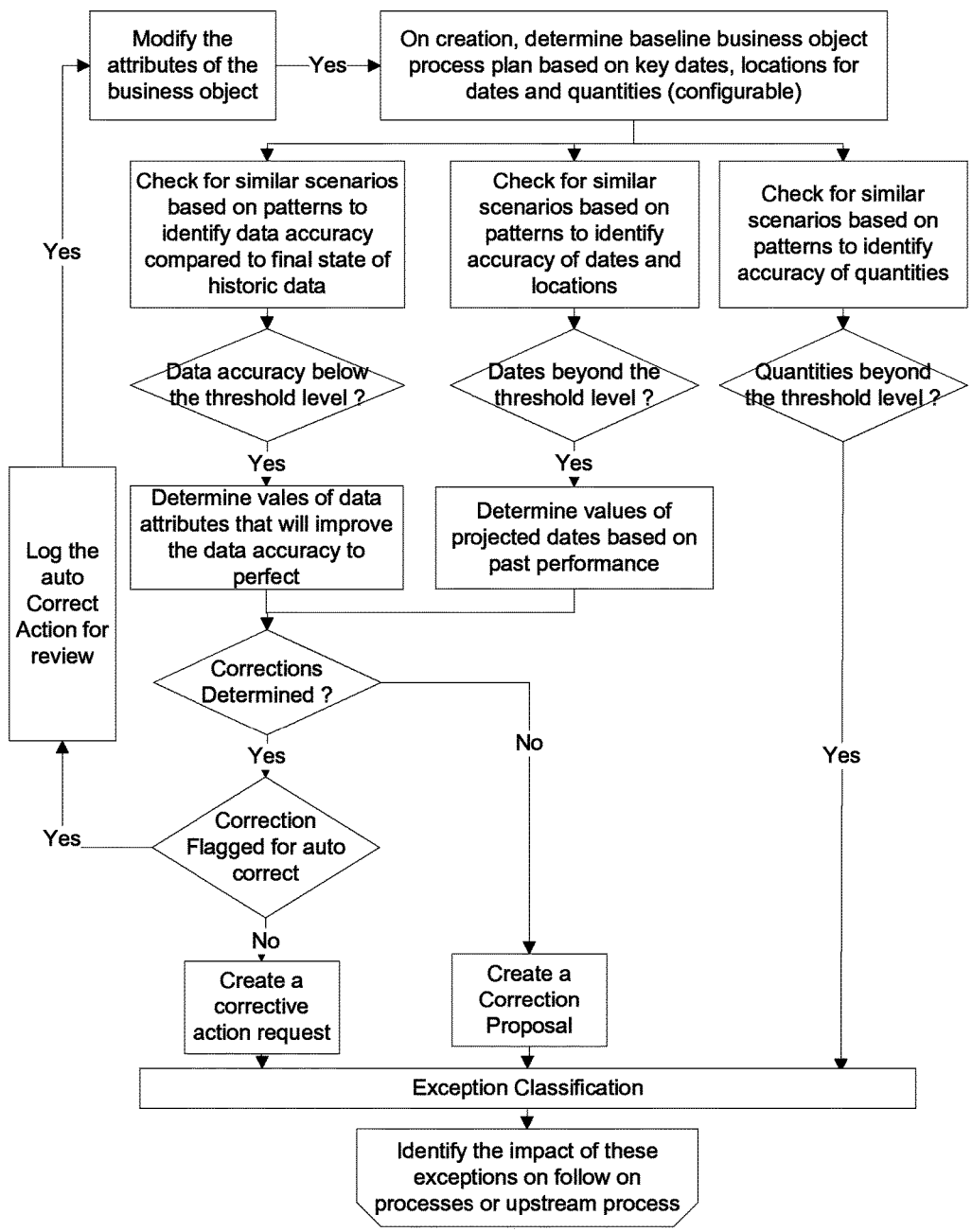

FIG. 8 shows a software flow chart showing how in a preferred embodiment, the invention determines exceptions when the PADS database objects were initially created.

Figure 9:
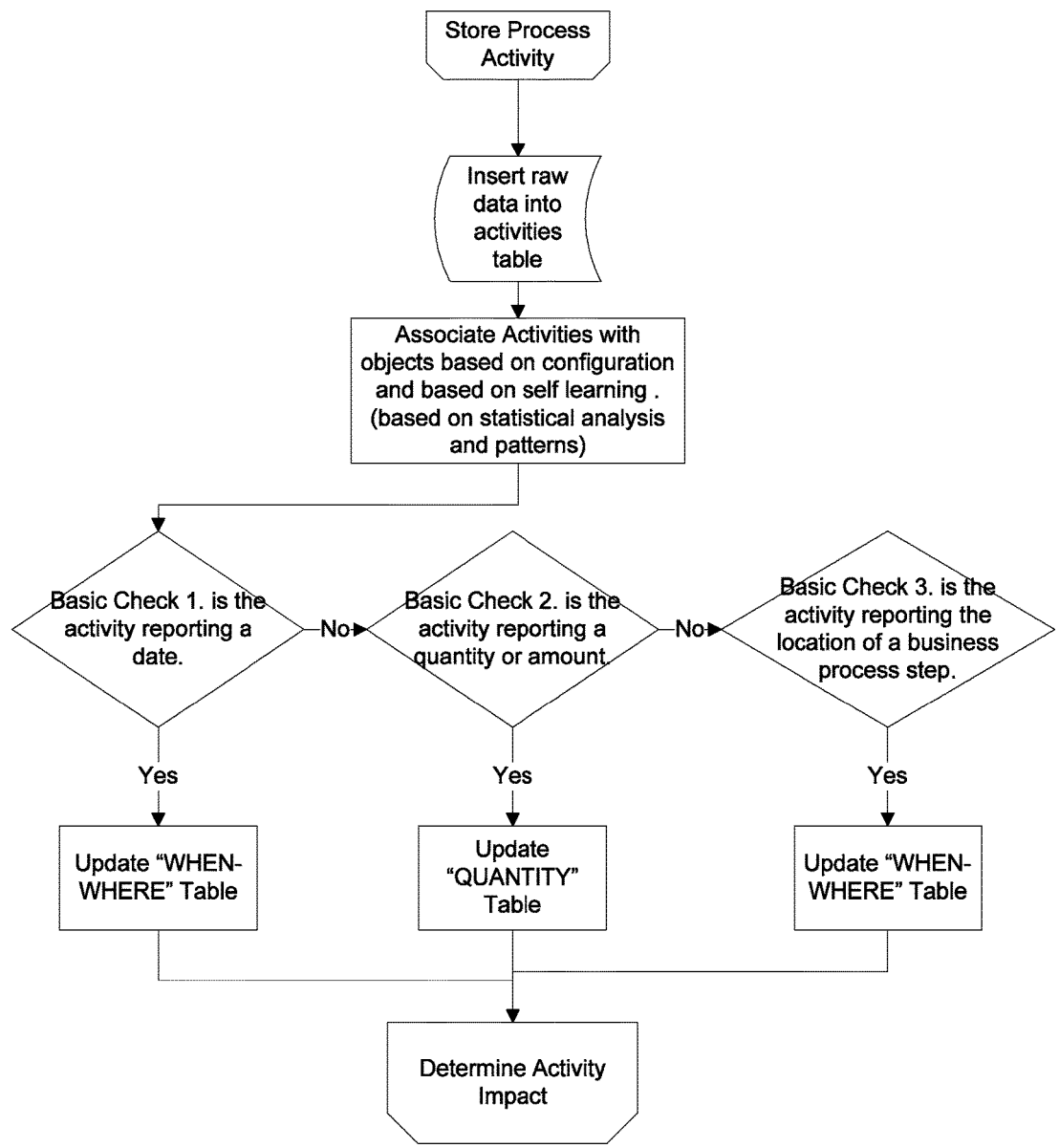

FIG. 9 shows a software flow chart showing further details of how the system analyzes raw data pertaining to various activities.

Figure 10:
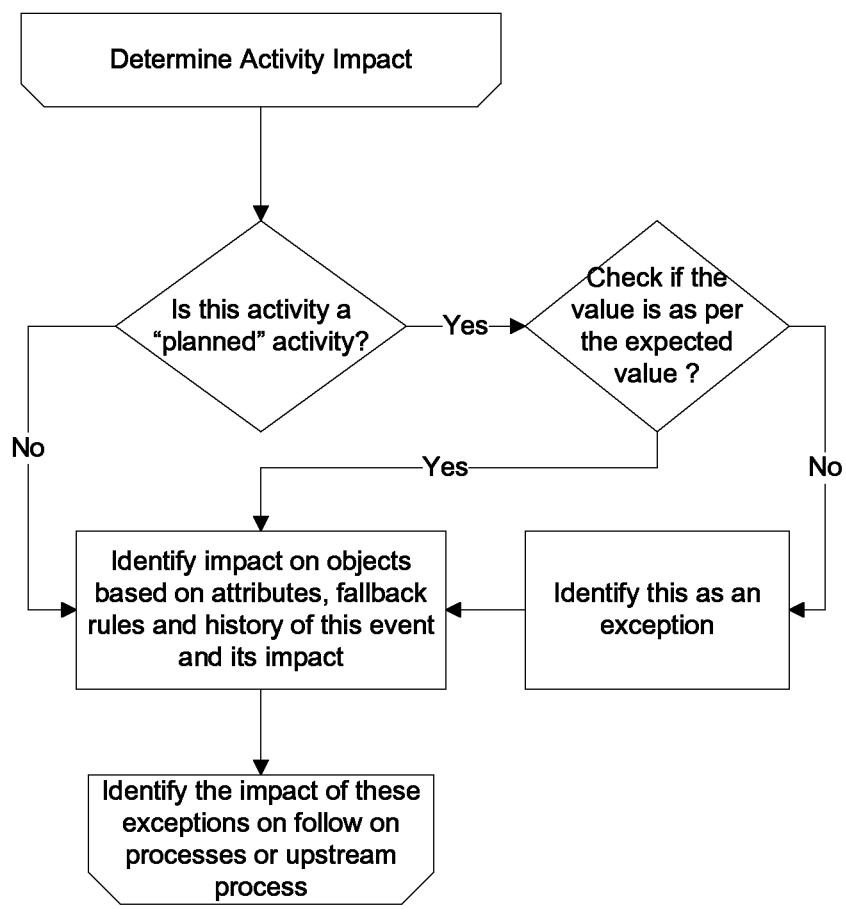

FIG. 10 shows a software flow chart showing how the system determines if various activities are either "planned" activities (e.g. expected with standard rules for exceptions already established) or "unplanned" (not expected, so automatically analyze exceptions using fallback rules for when standard rules are not available). In some embodiments, the system may be configured to obtain such fallback rules by analyzing patterns of historical data (e.g. automatically determined what happened in similar situations like that in the past) and using this historical data to estimate the impact of any unplanned deviations.

Figure 11:
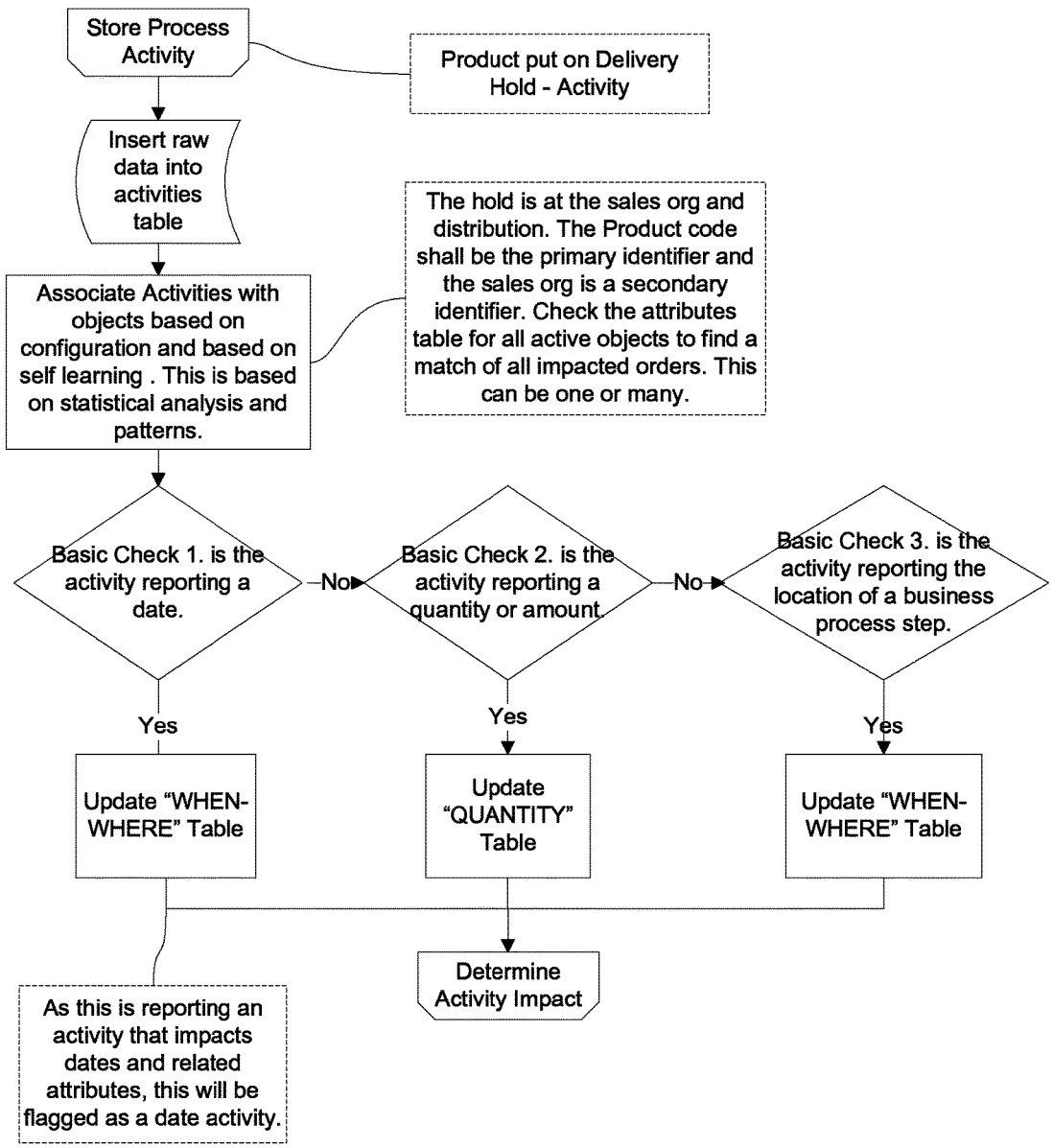

FIG. 11 shows software flow chart showing a first example of the invention's exception analysis system in operation for a business process. Here someone in the sales organization has informed the system that a particular "thing" (product normally available for sale) has been put on delivery hold (perhaps the product in inventory was defective and needed to be replaced). This "product hold could thus potentially impact the delivery dates for various customers.

Figure 12:
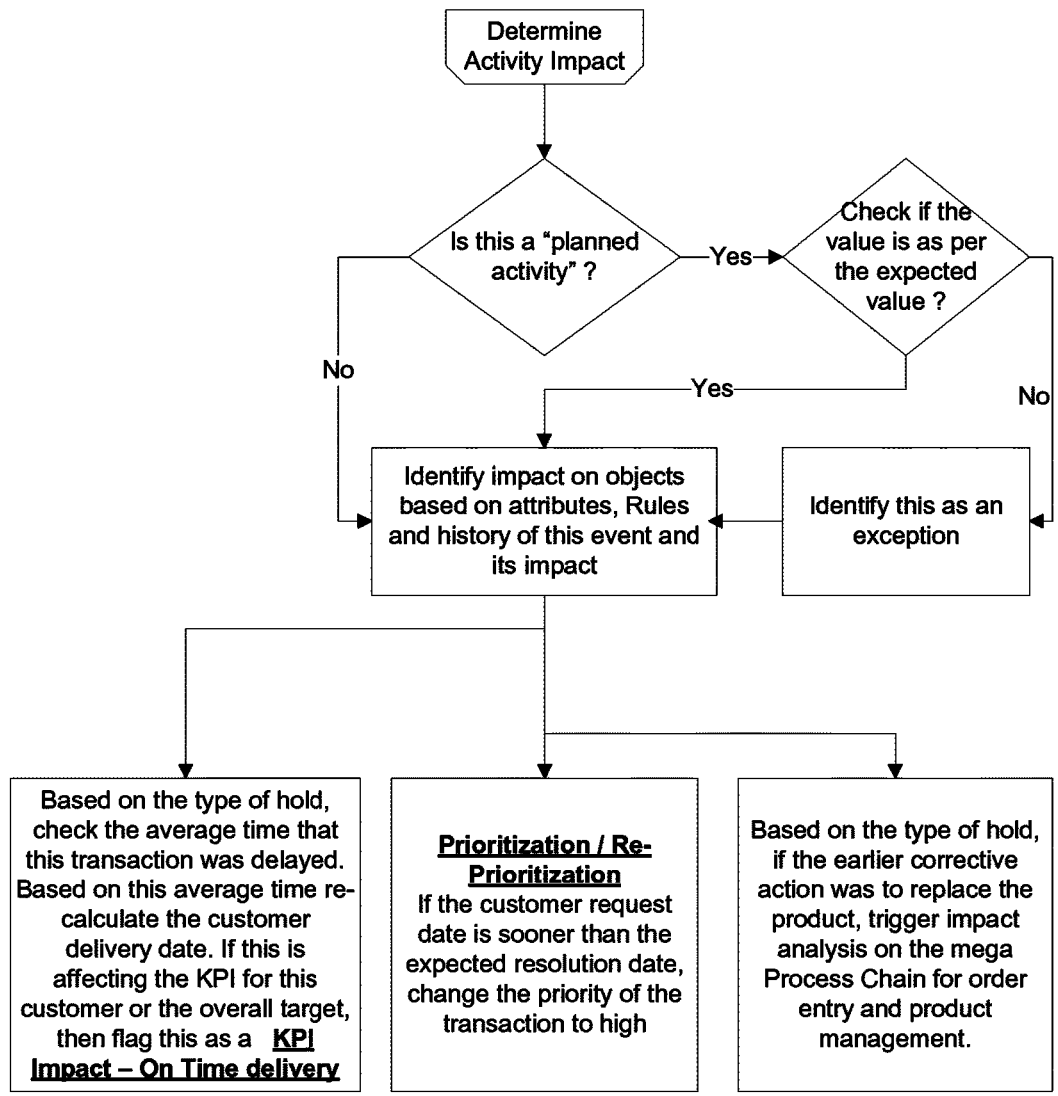

FIG. 12 shows how, in this first example, the system analyzes the impact of placing a product on hold on various subsequent (e.g. dependent) processes and activities. Here if the system determines that this hold is "planned", the system can use its standard expected value algorithms to determine the resulting impact. However if the system can't find standard rules, and instead determines that this "on hold" event was not "planned", and the impact of this exception can be analyzed using various fallback rules. Either way, the impact of placing the product on hold has on various downstream processes, such as various customer deliver dates, can be almost instantly calculated and reported by the system.

Figure 13:
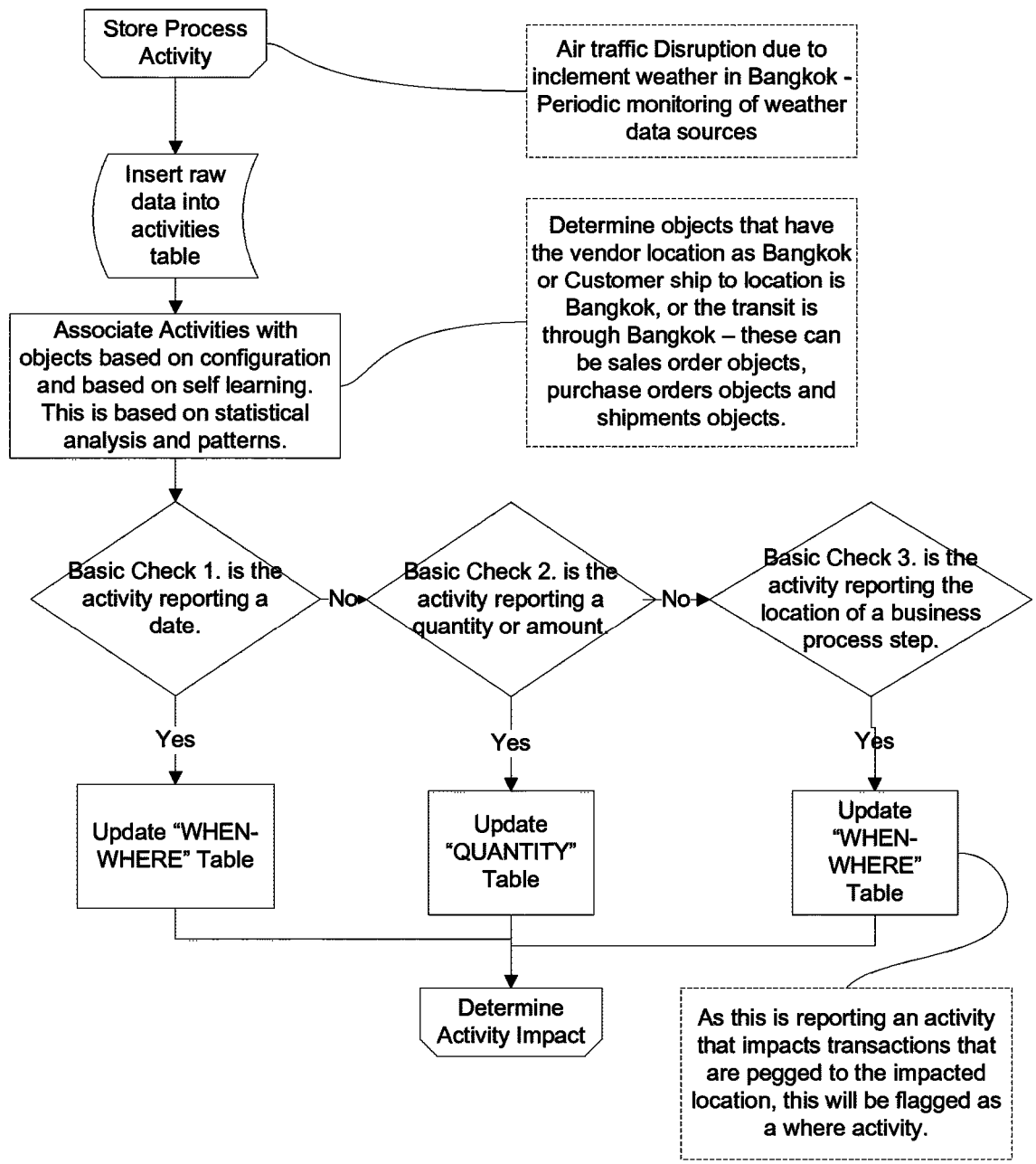

FIG. 13 shows a second example of the invention in operation. Here the system is handling the impact of bad weather on product shipments (e.g. from a supplier). In FIG. 13, the system is doing the initial data input and PADS object creation steps of the process.

Figure 14:
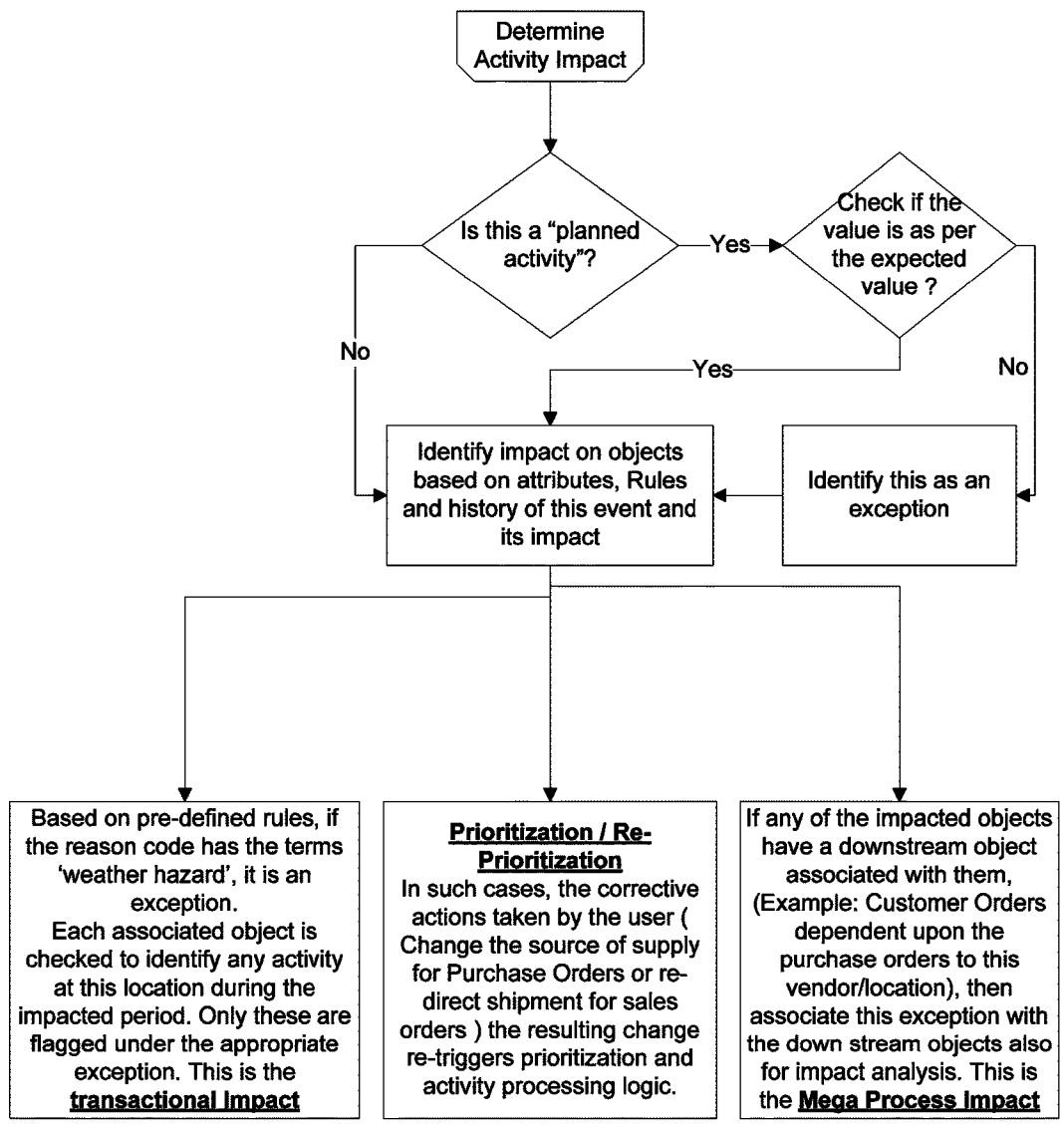

FIG. 14 shows how, in this second example, the system then analyzes the impact of this supplier shipment delay on subsequent (e.g. dependent) processes and activities. As before, if the system determines that this shipment delay was "planned", the system can use its standard expected value algorithms to determine the resulting impact. However if the system can't find standard rules, and determines that this "shipment delay" was not "planned", and the impact of this delay can be analyzed using various fallback rules. Either way, the impact of the shipment delay on various subsequent business processes can be almost instantly calculated and reported by the system.

Figure 15:
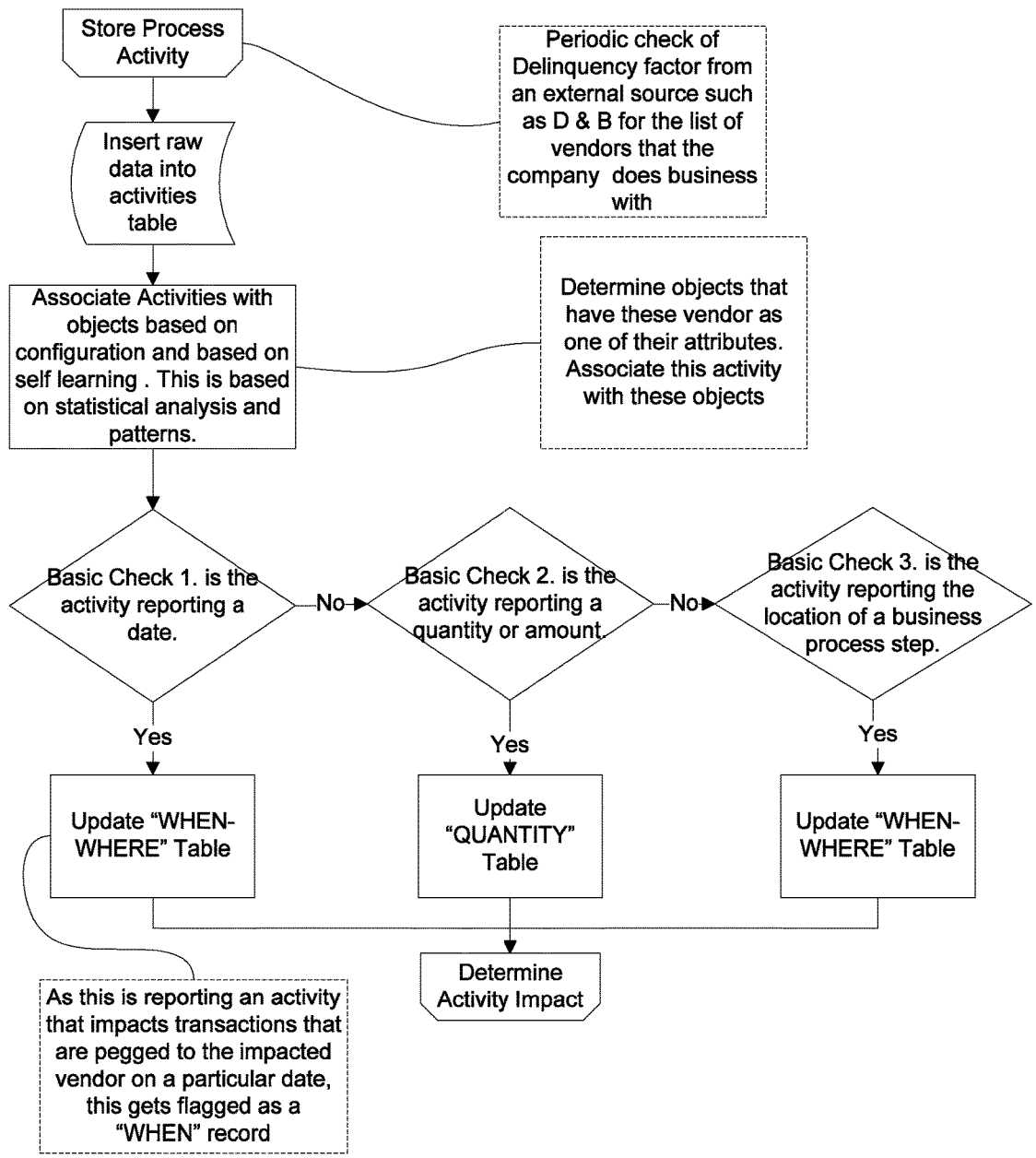

FIG. 15 shows a third example showing how the system can handle more complex problems, such as the problem of a supplier or vendor having chronic reliability or delinquency problems. Here the system is configured to receive automatic data feeds from various external sources. Here the system automatically received business status information from an outside source, such as Dun & Bradstreet (D&B) showing that the suppler or vendor was in serious financial trouble. The system can use this to estimate the impact of an impending vendor failure on various products (things) or activities provided by this vendor, and hence on other dependent business processes. Here the data has been obtained from a business rating service provider (such as D&B), and the system is automatically linking this information, via the PADS database objects, to the various products or services provided by this problematic vendor.

Figure 16:
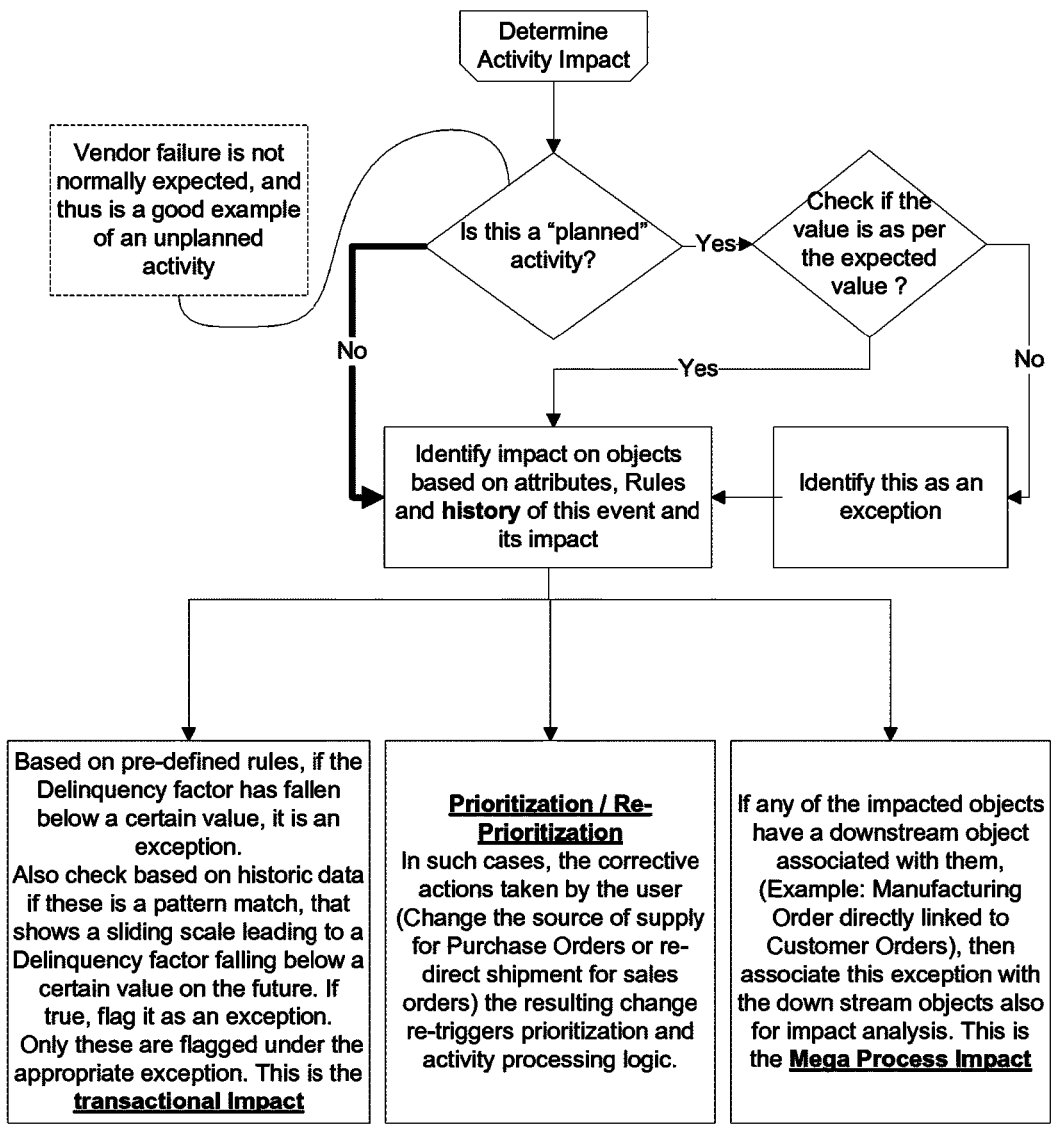

FIG. 16 shows the continuing analysis of the third example previously discussed in FIG. 15. Since vendor failure is unusual, this third example is a good example of an unplanned activity. Here the system can use various fallback rules such as "analyze if vendor is experiencing a chapter 7 (vendor will likely cease operations) or chapter 11 (vendor will likely continue to operate) bankruptcy" and estimate the impact on various dependent processes accordingly.

DETAILED DESCRIPTION OF THE INVENTION

Although, as previously discussed, the various systems and methods described herein can be used by many different types of organizations for many different purposes, the systems and methods disclosed herein are particularly useful for helping businesses manage complex business processes across multiple locations, vendors, service providers, and customers. Thus throughout this discussion, various business processes and business applications will be used as specific examples of the invention in operation.

As previously discussed, the present invention addresses the limitations of current state of the art OLAP type BI systems in solving a business's need for the ability to deeply assess the impact of internal events, external events and non-events on their business processes and transactions in real-time, based on rules that can be updated as business needs change in a self-learning framework.

According to the invention, such fast and deep analysis can be facilitated by using a process-agnostic method and data model to record and analyze relevant enterprise data. Data from varied processes (examples: Sales, Supply, Manufacturing) can be stored in a relatively raw format, and modeled to facilitate uniform automated access, irrespective of the originating process that generated the raw data. The invention's PADS data oriented system and method also facilitates easy cross-linkage, pattern recognition and "what-if" type analysis of data across processes.

In some embodiments, the invention may be an automated system or method for detecting and reporting exceptions to various different real-world processes. Generally these real world processes are formed from various real world things (e.g. goods, products, raw materials in a business context) and various real world activities that are often performed on, or using these various real world things. An activity, for example, might consist of a simple step such as ordering a product, placing something on hold, shipping a product, one step in a manufacturing process, and so on. Usually at least some of these various real-world things and activities in turn are linked together to form real world processes. Thus a real world manufacturing process might combine multiple raw material things and various manufacturing activities to produce a finished good. A real-world delivery process might combine multiple raw material things (e.g. various products to be shipped, and the shipping carton) and multiple activities (accepting the order, loading the products into the carton, bringing the carton to the shipping location, shipping the carton, finally delivering the carton to the customer, getting the receipt, getting payment for the order, and so on.

Figure 1:
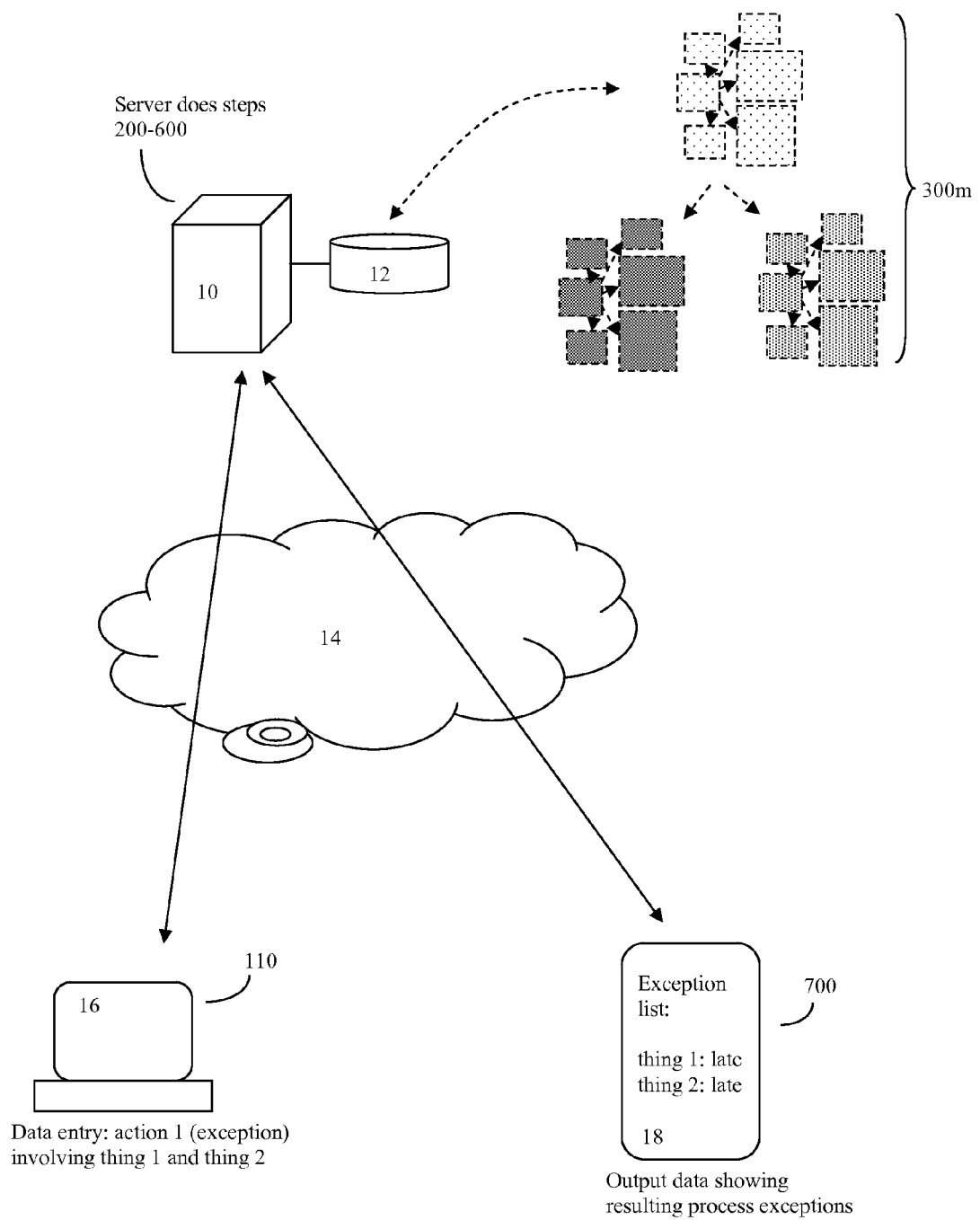
FIG. 1 shows how the methods disclosed herein may be implemented on a computer server system, connected to various other computerized devices through a network such as the internet.

FIG. 1 shows how the methods disclosed herein may be implemented on a computer server system, connected to various other computerized devices through a network such as the internet.

According to the invention, at least one computer processor, such as a processor located in a computer server (10) can be used to receive raw data properties pertaining to various real-world things and activities. These raw data properties will generally comprise data such as when-where data (e.g. the location and time that the thing or activity is or may be taking place), attribute data (some attribute data may comprise link attribute data), identifier data (e.g. thing-activity identification code to identify with specificity what thing or activity is involved), and quantity data (e.g. how many things, or how much money was involved, etc.) associated with these real-world things and activities.

Although this raw data could be input directly into the computer housing the computer processor, such as server (10), often at least some of these raw data properties may be received from a human or automated user by way of a remote, network connected computerized device (such as terminal or computer or tablet computer or smartphone (16) and a computer network connection (e.g. internet connection 14). Generally the remote computerized device (16) itself will have at least one remote processor. In some embodiments, this remote processor will do some preliminary data processing, such as accepting and error checking the raw data properties from the user, and automatically linking these raw data properties to other information. This other information can, for example, be information relevant to the object header or thing-activity identifier data (for subsequent use by the PADS database objects). In this embodiment, computer (16), optionally assisted by ERP type data entry software or other data source software (110) thus uses its at least one remote processor and its network connection (14) to receive raw data properties from the user along with other information such as object header information and/or thing-activity identification information. Here "thing-activity" identifier information can be, for example, a serial number or other identification scheme to uniquely identify which particular thing or which particular activity is covered by this particular set of raw data.

In real time, or as these raw data properties are received, the invention will typically use at least one computer processor (such as server processor(s) on server 10) to create and store these raw data properties, thing-activity identifier data and any link attribute data in computer memory a PADS database with various PADS database objects (see FIG. 3). In a preferred embodiment, these PADS database objects may be stored in rapid access computer memory such as RAM or flash memory (for higher access speeds). In this regard, use of in-memory computing techniques, such as the SAP HANA system, can be useful. Alternatively the PADS database objects may also be stored on computer disk memory and other forms of computer memory. The computer memory used by the PADS database objects is shown in FIG. 1 as (12), and a diagram of some of the PADS database objects in the computer memory (12) is shown as (300m).

These computer memory based PADS database objects generally comprise object header information and at least one set of when-where data, attribute data, thing-activity identifier data, quantity data and object exception information.

According to the method, when the object header information and other information is received (the object header can either be received along with the raw data properties such as from device (16), or alternatively the object header information can be obtained by using computer processor (s) (10) to compare the raw data properties against a previously defined set of categories of real-world things and activities, classify this raw data according to these previously defined categories of real-world things), the system then (preferably in real-time) will also determine the object exception information.

This object exception information can be understood as being an automated way of having the computer scan the raw data properties, and determine if anything is not as expected or as desired. If so then in some embodiments, a computer memory record of this exception (e.g. that something is not expected or desired, and related information) can be stored in the PADS database objects in computer memory in an exception information data field (see FIG. 3, 300.5).

More specifically, this object exception information can be obtained by using the computer processor(s) (e.g. in server 10) to compare the raw data properties against a set of previously defined baseline properties of a defined set of real-world things and activities. Is there a match, or is something not right? The system is configured to automatically determine if any of the raw data properties represent an exception from these baseline properties. If an exception is found, it can be stored in computer memory (12) and PADS database object memory (FIG. 3, 300.5) as object exception information. From a terminology perspective, those PADS database objects that have at least one exception (e.g. at least one item of stored object exception information) will be designated as "exception marked PADS database objects".

According to the invention, at least one computer processor (again such as one or more server processors in 10) can be used to link at least some different PADS database objects (comprising data pertaining to real-world things and activities) together to form real-world processes. This can be done by various methods, such as by setting the link attribute data in the different PADS database objects to create appropriate links according to at least one set of process linking rules. Other linking methods will also be discussed shortly.

For example, a product sales process might link order activities, various things for sale, shipping activities, billing activities, product return activities, complaint activities, and the like. Here the set of process linking rules (e.g. software) can be used to let the system know that some things and activities should be linked together in the product sales process. From a terminology perspective, those PADS database objects that are together by setting this linked attribute data will be designated as "linked PADS database objects". Again, in a preferred embodiment, the above steps will be done in real time, at least as the raw data is received by the system. Here "real time" will generally mean times between 0 to 5 minutes, and often times less than 60 seconds.

After the above steps have been done, and then preferably on a real-time basis, and/or additionally according to other timing criteria, the invention can automatically use at least one computer processor (e.g. server 10) and at least one algorithm to analyze these various exception marked PADS database objects, and various linked PADS database objects. In particular, the system can then determine an impact that any exception marked PADS database objects has, via the linked PADS database objects, on the status of at least some real world processes. As a result, the system (e.g. server 10) can determine if there are any real-world process exceptions. The system can then use its computer processor (and various external computerized devices such as device (18) and software (700) to output data pertaining to at least some of these real world process exceptions.

Figure 2:
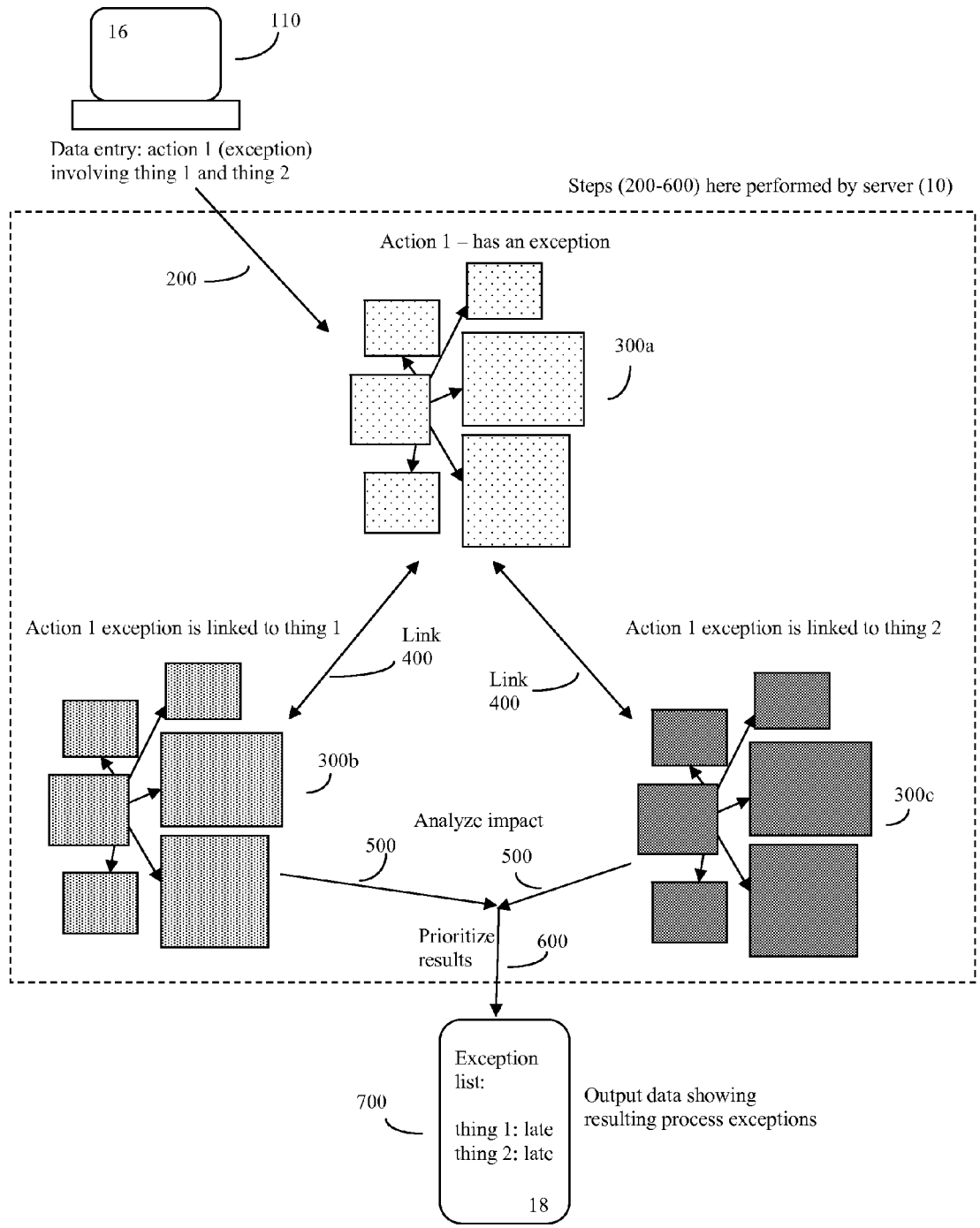
FIG. 2 shows more detail of the system where data (typically involving various business processes involving various real-world things and activities) is received from various human and non-human data sources (often from external computerized device). This data may be analyzed and stored (often in real time) in the computer system's memory as a series of process agnostic data store (PADS) objects linked together to form various real world processes (e.g. business processes). Thus when any exceptions occur, the system can rapidly compute how these exceptions impact the various real world processes, as well as rapidly output data pertaining to the resulting real world process exceptions.

FIG. 2 shows more details of this system and example of the system in action. As before the raw data is received (often into a server 10) from various human and non-human data sources (e.g. from external computerized device 16). Here some of the various software steps (described in more detail in FIG. 5 and elsewhere) taking place in the processor(s) and memory of server (10) are shown.

In this example, raw data involving an "action 1" that ultimately will impact two different goods (here, called "thing 1" and "thing 2") is entered using a remote computerized device (16) optionally as handled by data source software (110). Then as per FIG. 1, this data is transmitted over a network such as the internet (14) to server (10) which then is running some or all of the software (100 see FIG. 5) responsible for implementing the invention's methods.

In this example, assume that there is a problem. Perhaps both things were to be shipped on the same transport, where action 1 represents this transport activity, and the problem (exception) is that the transport is delayed.

As the raw data is received, it is analyzed at the server (10) using various software modules (200, see FIG. 5 for more detail) and is automatically stored in the server's system memory (12) as a series of process agnostic data store (PADS) objects (300*a*). The data pertaining to thing 1 and thing 2 (here represented by PADS objects (300*b*) and (300*c*) are linked to the transport activity object (300*a*) because they are both connected to the same transport activity.

Note that this transport activity PADS object (300*a*) can also be linked (via linking process 400, see also FIG. 4) with other PADS objects for other activities (not shown) to form a larger real world process, such as a sales and distribution process (not shown).

Thus when any exceptions occur, the system can trace the links (using software modules 400), analyze the impact of any exceptions (using software modules 500, see also FIG. 5 and elsewhere) and rapidly compute how these exceptions impact the various real world processes. The impact of the exceptions can also be prioritized for reporting purposes as well according to other software modules (FIG. 5, 600, see also FIG. 6 and elsewhere). This allows the system to rapidly (preferably real time) output data pertaining to the resulting real world process exceptions. This data can be output on computerized device (18) or elsewhere.

In the example shown in FIG. 2, the prioritization software has concluded that the impact of the exception (delayed transport) is that both thing 1 and thing 2 will be late, and that according to the prioritization criteria (software module 600), thing 1 is more important. Thus the server (10) transmits data (e.g. to smartphone 18) (with the aid of software module 700) showing that both thing 1 and thing 2 are likely going to be late, and that thing 1 is more important. Thus thing 1 is reported first.

Put alternatively, and as also will be discussed further, in some embodiments, the invention may use at least one computer processor (again this can be in server 10) and at least one algorithm to analyze these exception marked PADS database objects and linked PADS database objects and determine an impact of these exception marked PADS database objects and linked PADS database objects on a status of at least some of real world processes. This allows the system to determine various real-world process exceptions. Note that although preferably this will be done automatically by the system on a real-time bases, in some embodiments this can also or additionally be done by the system on a non-real time basis as determined by schedules set according to other criteria. For example, the accounting department may also wish to schedule their own runs and analysis according to a calendar schedule, such as one a day, week, month, quarter, etc. Alternatively an auditor may wish to schedule a surprise audit of the system's state at a certain time and date, and so on.

The invention may use various different software schemes and linking methods to link the various PADS database objects. Some of these will be discussed in more detail in FIG. 4 and related paragraphs. Generally, the invention's linking methods (400) enable PADS database objects, such as (300*a*), (300*b*), (300*c*) that comprise data pertaining to real world activities and things to be linked to any number (including zero) of other different PADS database objects comprising data pertaining to real world activities and things. Thus, for example, any given PADS database object, pertaining to things, such as (300*b*) and (300*c*) can be linked with zero or more different PADS database objects comprising data pertaining to different real world activities, such as (300*a*). Here the system may use at least one processor (again often located on server (10)) to create, delete, change or otherwise alter at least some of these links according to at least one set of business process link configuration rules.

FIG. 3 shows a more detailed view of the logical links and data fields of a PADS database (shown in FIG. 5, 300) schema in a standardized Entity-Relationship (ER) notation showing different database entities and conveying key relationships among them, including the components of each entity's primary keys (PK) shown in the upper half of each entity's diagram box. The "1:N" notation shows that an object in one entity may be associated with zero or more related objects in another entity but not vice versa. For example one object in Header entity (300.0) may be associated with multiple objects in Identifiers entity (300.1). The "FK" (Foreign Key) notation associated with a field in an entity indicates that value in this field may be used to locate the object, in this or more commonly another database entity, that contains the primary information about that particular object. This PADS database object scheme allows various business things and activities to be decomposed into values such as time and place (what-where), quantity, identifiers (useful for linking to other objects), and various attributes, and stored in computer memory. In a preferred embodiment, the system also stores exception data in the PADS database object at the time that the object is initially created.

In some embodiments (in particular to OLAP type BI based systems for broader and deeper type business management purposes), the PADS database objects operate by abstracting raw-data into a small number of general but enterprise relevant categories. In these embodiments, the same basic type of abstraction will operate, regardless of the specific business process that the raw data belongs to. These basic categories can include:

Object Header information 300.0, which can store fundamental details for all PADS objects; Identifier Data 300.1, which contains various data object identifiers, and is useful to help in the linking process; Attribute Data 300.2, which can contain all the parameters that do not belong to the other cases; When-Where Data 300.3 which can contain location and time based parameters, Quantity Data 300.4; and Exception information 300.5. This data model helps uniformly store and access data irrespective of whether the data belongs to different areas such as sales orders, purchase orders, production orders, shipping documents, invoices, plant maintenance orders, and the like. As previously discussed, having all data from all relevant business processes packaged into a unified model greatly facilitates fast access for various OLAP type pattern recognition and what-if analysis purposes.

Note the difference between prior art methods, and the invention's methods. The present invention teaches use of database objects which are relatively generic (e.g. process agnostic). By contrast, prior art enterprise application data models generally tended to use customized database objects that were relatively specific to the artifacts specific of the business activity at hand. Thus, for example, in a sales system, the key prior art database objects might be limited to customers, finished goods, sales order header, sales order lines, and so on. In a procurement system the key prior art database objects might be limited to vendors, raw materials, purchase order header, purchase order lines, and so on. By contrast, the invention's process agnostic methods impose no such limitations—activities across multiple such processes are harmonized into the PADS database.

Note also that in prior art large enterprise systems, some of these objects might only be references to a master data management system object—for example materials in place of finished goods and raw materials, or business partners for vendors and customers.

While such prior art data models might be sufficient for various custom-built applications, use of such specific database objects still leaves much to be desired. For example, in such a data model, any searches generally have to be specific for a material or a business partner. Thus it is difficult to give a legacy OLTP system an ability to handle searches for a business partner who is both a vendor and a customer. Additionally, with regards to legacy systems, the burden of adding new searchable attributes (e.g. a new warehouse location) generally requires additional custom programming, and is thus both slow and expensive. With legacy systems, adding other new functions, such as creating linkages between a given sales order and a purchase order, also generally to requires additional custom programming, with the same drawbacks.

By contrast, the invention's PADS objects method, based on process agnostic objects, allow for more generic data models that are significantly more flexible and easy to configure. Indeed the invention's PADS objects approach allow for improved forms of statistical analysis and machine self-learning, because the system is better able to handle data that spans multiple business process.

Regarding Linking:

Links can be static links, or data driven (e.g. dynamic) links. FIG. 4 shows one method of how the system can use PADS data to link various "things" (stored as PADS database objects) to various activities (also stored as PADS database objects).

According to one automated method, linking data can be stored as FK (foreign key) data (see FIG. 5 (300.1), (300.2), (300.3), (300.4), (300.5)), which can be used to provide the various fundamental linkages at a static level.

Often, however, the linkages may be data driven (e.g. dynamic). For example, if an activity puts a certain material on hold, then the Attribute Data 300.2 may be examined to find the fields (e.g. rows) where the attribute name is "material" and the attribute value is that specific material. This in turn allows the system to find the relevant SERIAL NUMBERS which in turn allows the system to find to all of the other header objects that are then evaluated for impact by this activity.

FIG. 4 shows an example of this type of data driven (e.g. dynamic) chain of determination in operation.

Here an Object Header (300.0) field (e.g. table row) identifies a real-world "thing" (if the PADS database object is for a thing). If the PADS database object is for an activity (300.3, 300.4), then the Object Identifiers 300.1 field, which contains a set of associated Identifier-value pairs, can be used to indirectly link the activity to other "things" by means of having at least one Identifier-value pair in common with the thing.

Consider for example, a WHEN-WHERE type of Activity, where Material M-12 has been put on hold because of short inventory.

For every Identifier-and-value pair in the WHEN-WHERE field 300.3 (e.g. table record) being processed, the system can first look up the matching rows in the OBJECT IDENTIFIERS field (300.1), and match the input Identifier to the ATTRIBUTE field, and its value to the ATTRIBUTE VALUE field. This process can be repeated for every pair of Identifier-and-value contained in the Activity record.

This process thus finds the IDENTIFIERS Table rows which have at least one specified Identifier-value pair in common with the Activity record being processed. The foreign key (FK) SERIAL NUMBER field in the IDENTIFIERS Table records can then be used to provide the requisite cross-linkage to identify the HEADER Table records in which the SERIAL NUMBER is the primary key (PK), thus achieving the proper linking.

FIG. 5 shows a more detailed block diagram (100) of some of the major software components of the present invention's system and method. Here these major software components may be called, in the alternative, "PADS database object management software".

According to the invention, at least one and often multiple data sources (110) can provide raw data into the system pertaining to various things and activities. These input data sources can include a business's own enterprise resource planning (ERP) Systems (111), as well as the electronic data interchange (EDI) Systems of outside agencies, such as various business partners (112).

In some embodiments, the ERP system (111) used as the source of primary data about various things and activities can be a legacy ERP system (for example: SAP ECC, Oracle E-Business, JDEdwards EnterpriseOne). Similarly for (112), the EDI Systems of business partners (example: suppliers, logistics providers) can be used to provide additional information about various things and activities as well.

As an example consider an order (activity) for a thing that is a raw material. Here a supplier may provide periodic updates on this order, such as completed stages of production, preparing for delivery, an advanced ship notification (ASN), and so on.

Additionally, other External Data sources (113) or Social Media sources (114) may also be used to obtain data. These types of external data sources may provide additional inputs that may or may not relate directly to a single business object or activity; instead their correlation is discovered by the system. For example, imagine that a natural disaster renders a region temporarily inaccessible: this might be correlated to suppliers and customers, warehouses and logistics providers; and consequences can be delay in receiving raw materials or a decision to delay shipping to a customer, and so on. Such business impact must be uncovered, assessed and prioritized. Alternatively input from business rating sources, such as Dun & Bradstreet, may also be incorporated. In an analogous manner, various Social Media data sources (example: twitter) may be integrated into the system by way of identifying and correlating the input to relevant business things or activities.

The data input formats and methods (120) may be varied in form, interfaces and use of various communication methods, as is known to be fairly typical in any large enterprise system today. Here this layer of software in the FIG. 5 system architecture diagram has been simplified. Data may be transmitted as simple flat file objects (121) (example: comma separated values—CSV) using file systems, HTTP methods (122) or RSS feeds (124). Additionally or alternatively, use of various stateful interaction models (123) such as Java Database Connectivity (JDBC) or simple object access protocol (SOAP), or RESTful webservices and mobile feeds may also be used.

The computer networks used (see FIG. 1 (14) may be generally-connected endpoints on LAN/WAN systems, generally-disconnected endpoints such as Mobile devices (125), the internet and associated internet connected devices, and the like.

As previously discussed in FIGS. 2 and 5, the raw input data may be stored, interpreted, and transformed (200) by parsing it for conformity to syntax (210) and then recording it in the system (220) for any backtracking needs. The data can also be analyzed for semantic correctness and completeness, and various error correction software can be invoked in case any errors or missing data elements are detected. Here for example, the system can automatically flag aberrant raw input data as erroneous, and flag it for subsequent review by a designated user or the sender. Alternatively the system may trigger certain automated corrections.

Here for example, if a date field was expected in the data, but the input date format is incorrect, or the input date did not include the year, the correct answer can often be automatically inferred by the system. Similarly if a business partner name is present, but the partner's identifier serial number is missing, the system can also attempt to automatically auto-correct based on various pre-defined rules (230). These correction methods may be maintained via configuration rules, or errors may be corrected based on rules self-learned by the system using various machine learning software methods (240).

After the raw input has been filtered for errors, it goes through an automated process that identifies the relevant business activity or activities (250) represented by the data. Following this phase, the required PADS database objects are created (260) in the process-agnostic data store (PADS) database (300).

For example, a material (e.g. a thing) at a shipping location could be placed on hold (an activity, where an absence of an activity is also an activity). This in turn may impact numerous business partners, orders, KPIs, etc.). This hold could impact a number of sales orders for that material, a new order being created in a manufacturing process, or require that the confirmed delivery date being for a purchase order that in turn is tied to a sales order, be updated.

In association step (400), after the raw data has been automatically input into the PADS database, the system next correlates the PADS database objects to any relevant business process or processes (410), things (420), activities (430) and to any applicable patterns (440) based on historical data. This helps determine the scope of each input data record in the PADS database system at that moment.

The next step, impact analysis and exception determination (500) can be a continuous activity that often will be triggered in real-time as new data arrives. Alternatively this step can also be triggered by other criteria, such as the passage of time, or other pre-defined triggers as discussed previously.

Here the system may use various methods of assessing the impact of various exceptions. These methods can include rule-based methods (550), historical data-based methods (560) or historical pattern-based methods (570). The key difference between the latter two (560 and 570) is that the historical data based methods (560) are based on a statistical abstract of historical data, while the pattern based methods (570) may be based on various patterns in the historical data that can be inferred using various types of machine learning methods. The invention may often combine different assessment methods as well. Here for example, the system may automatically handle a business exception that is taking too long to clear by using a first rule (e.g. an "over 5 days" rule) as well as a second rule based on historical data (e.g. an "age exceeds 66 percentile of historical data" rule).

The system can then compute the impact of various exceptions on various processes, things and activities. These can include the impact of exceptions on various transactions (510), processes (520) and pre-defined metrics or KPIs (530).

Particularly large processes (e.g. processes formed from combinations of other processes, here termed "mega-processes") can also be handled by the system. When such "mega-processes" are defined in the system, then the linkages between the various impacted objects and processes may be determined using pre-defined linkage attributes. This allows the impact processing to continue over all impacted processes, transactions and objects (540). For example: a sales order in a sales process may be linked to a delivery document in the delivery process, or to a procurement order for a raw material in the supply process. All of these different processes could be adversely impacted by a credit hold placed on the customer who placed the original sales order. For such mega-processes situations, it is useful to configure the system to clearly identify which initial exception (and resulting impact) is the cause, and which resulting impacts are the effects.

In addition to analyzing raw data, and determining the impact of various exceptions on various processes, the system can also be configured to automatically estimate the relative urgency and the magnitude of such impacts. For example, an exception, such as raw data showing that a material (thing) has been placed on hold (an activity) can potentially impact several order lines, some of which might be more urgent than others. Here the system can be configured to determine (for example by examining their imminent schedule delivery date, or by examining the value of the orders) that the impact of the exception on some orders will be more important than the impact of the exception on other orders.

To do this, another set of software modules (600) can be used to prioritize the impact of various exceptions on various categories such as urgency, magnitude of impact, cost of inaction, and the like (610). Here for display purposes, higher (more severe impacts) may be analyzed according to various pre-defined algorithms, and be reported as most urgent first, ranged by color coding as to urgency, be given numerical ratings, and the like (620).

After the impact results have been analyzed in (600), the system may also employ various software modules (700) to provide an intuitive visual interface to the end user. In some embodiments, these software modules may be implemented on various remote computerized devices (e.g. FIG. 1 (18)), while in other cases, these software modules may be implemented on servers (10), or split between servers (10) and various remote computerized devices (18).

The subsequent paragraphs present further details of the various system components and methods.

FIG. 6 shows a software flow chart giving a high level view of the how the invention operates. Raw data is parsed, transformed, interpreted, identified as a new business object (e.g. a new sales order or a manufacturing order for one or more "things" or products) or alternatively as a process activity on an existing business object (e.g. a material or "thing" temporarily placed on hold). The data is automatically checked and auto-corrected (to the extent possible) and then stored in the PADS database. More specifically, here the system automatically attempts to review and correct the raw data, including any data flagged for errors, and any system generated corrections or gap-fills. The system can also alert human users in the event that it encounters problems that it cannot automatically correct.

After the data is received, parsed for syntactic correctness and repaired for missing or miscoded data elements based on pre-defined or self-learned rules, the data is now ready to be entered into the application's PADS database as various PADS database objects. To do this, the system's processor(s) and software analyze or parse the data down into various parts, and then correlate the various PADS database objects to applicable activities, processes, things and patterns.

Here, the invention's PADS object type data model does not impose any particular process's semantics on the stored data. Instead a set of configuration rules is utilized to attach meaning, such as business meaning, to the various data fields of the various PADS database object. To accommodate a particular enterprise's idiosyncrasies, various user definable configuration rules may be used.

FIG. 7 shows a software flow chart showing step (200) of FIG. 5, showing the various processes of raw data storing, interpretation, and transformation in more detail. Here raw data (often obtained from external computerized devices (16) via a network connection (14)) can be parsed, processed, and stored as various PADS objects and processes. The input is parsed into various PADS object tables or fields shown in FIG. 3, such as the Object Header table or field (300.0), the Attribute Data table or field (300.2), various Identifier Data tables or fields (e.g. 300.1) and so on. The resulting PADS database object is stored in the PADS database (12) (300).

FIG. 8 shows a software flow chart showing how one embodiment of the impact analysis and exception creation determination module shown in FIG. 5 (500) can operate. In particular, FIG. 8 shows the process of run-time object co-relation when, based on the raw input data, new PADS objects are being created. Note that in a preferred embodiment, the invention determines exceptions as the raw data are received and the PADS database objects are initially created, as previously shown in FIG. 7 (500a).

The PADS database object activities can be reported in a number of different ways; and this reporting can be based on different parameters or a combination of parameters. In some embodiments, a PADS database object for an action, such as a vendor order acknowledgement, might be reported as an entry in a purchase order field or table in the PADS database object (300.4 Quantity Data). Similarly an activity that is a loading/transport confirmation or ASN (assigned serial number), might be reported as an entry in a line item or schedule line field or table in the PADS database object (300.3 When-Where Data).

However here the problem is that it is difficult to pre-determine all possible activities and use cases. This is because there are a large number of unpredictable combinations, and there is a danger that some activities may not be associated with the appropriate things.

To address this difficulty, in a preferred embodiment, the system identifies PADS database object things that are associated with PADS database object activities by matching a complete set of that activity's identifiers (300.1) against the attribute data (300.2) for other PADS database things or activities. This method allows a PADS database object for an activity to be associated with any number of other PADS database objects representing either other things or other activities.

One complication, however, is that not all activities are applicable in a business process at all times. For example, for an apparel maker, a cutting activity might become inapplicable after an order line item enters a later sewing stage or washing activity.

To address this type of issue, according to the invention, the PADS database objects may also have "states" database fields or table entries (see Object Header 300.0 in FIG. 3). These "states" fields are used to define the starting and ending stages of a business process where that particular activity is applicable. The system uses a set of configuration rules to determine if the "state" of a PADS database object is such that the particular activity is applicable or not. Thus even if the PADS database object activity identifiers (300.1) match the attribute data (300.2) for another PADS database object thing or activity, if the state values are incorrect, then the system automatically knows that no association should be made. Thus the "state" data essentially acts as an "AND" logical operation on the other matches, and ensures that PADS database objects are only linked if the state data is appropriate.

FIG. 9 shows a software flow chart showing further details of how the system analyzes raw data pertaining to various activities. In particular, it shows some of the steps involved in populating the When-Where Data (300.3) and Quantity data (300.4) of the PADS database objects shown in FIG. 3.

Planned vs unplanned activities 1: Planned activities are considered to be activities that are either expected to happen if all is going well, or activities where things may not always be going well, but at least the deviations are likely enough to be anticipated, and the activities can often be analyzed using objective or numeric data.

In the business process context, a planned activity may be an activity that is expected to occur during a specific time frame, or that produces or consumes specific quantities of resources. In a preferred embodiment, the system is configured to analyze raw data reporting on various activities and populate various PADS database object data fields, such as (300.3, 300.4), etc. accordingly. The system can then automatically analyze these particular PADS database fields, and numerically determine (at least for planned activity) if the activity is going correctly, or if an exception for that activity should be reported. Unplanned activities will be discussed shortly.

For some types of planned activities (e.g. when the baseline properties used for exception analysis are available, and may be relatively simple data such as specific baseline properties of key dates, locations, and quantities), then exception analysis can be relatively straightforward. Here the system can determine, for example, if any of the actual (e.g. real world received) raw data properties represent an exception from the baseline (expected or desired) properties.

To do this exception analysis, the system may use various types of PADS database object information (e.g. the object header and when-where information) and determine if the actual when-where data matches the desired or expected key date baseline properties. Similarly the system can also use various types of PADS database object information (e.g. the object header information, location information) to determine if the "where" part of the when-where data corresponds to the base line location value. Likewise the system can use various types of PADS database object information (e.g. the object header information, and the quantity information) quantities to determine if the actual quantity data corresponds to the baseline quantity value. If the system finds a lack of correspondence, then the system can flag this PADS database object as being an exception.

Linking or chaining activities (processes) together to form larger chains of processes (mega-processes):

Note that as previously discussed, a PADS database object can describe a standalone activity (e.g. be associated with a single business process), or alternatively it may be associated with other PADS database objects for other activities, and thus be associated with multiple processes that together form a series of linked processes (which may alternatively be termed chained activities, process chain, or mega-process).

For example a material master record could be represented as a stand-alone PADS database object, and a purchase order could also be represented as a part of a stand-alone PADS database object procurement process. However it is often more useful to consider the broader context, and consider linkages to other things and activities, and consider how any given activity is itself part of a larger process. To assess the impact of an activity on a larger process, as well as on other things, in a preferred embodiment, the system can associate the PADS database objects for activities with larger processes. This can be automatically done using the association software module (400) and (410) as shown in FIG. 5. These modules in turn can use various business process chain configuration rules, which may be user defined, to allow the system to track these relationships.

Planned vs unplanned (non-planned) activities 2:
Unplanned (non-planned) activities are generally defined as those activities that are rare, difficult to quantitate using precise rules, or otherwise undefined or unexpected. For example, if the raw data properties pertain to an activity, and if the system finds no previously defined baseline properties for these raw data properties, then the system can operate in a fallback mode. Here the system can use its at least one computer processor to further designate these types of activities as non-planned activities, and mark (e.g. store in memory in the appropriate data field) the fact that these PADS database objects are non-planned PADS database objects. The system can then use various pre-defined fallback rules for non-planned activity to analyze both these non-planned PADS database objects, as well as their associated linked PADS database objects. This allows the system to attempt to determine what impact these non-planned PADS database objects and linked PADS database objects have on various real world processes. Examples of unplanned or unexpected activities: customer credit rating being set on hold, warehouse shutdown due to power outage, and the like.

Alternatively, if the raw data properties pertain to an activity, and if the system finds that no previously defined baseline properties for these raw data properties, then the system can operate in an alternative fallback mode. Here the system can again use its at least one computer processor to further designate these types of activities non-planned activities, but here the system can mark (e.g. store in memory in the appropriate data field) the fact that these PADS database objects are "affected" PADS database objects. The system can then use various pre-defined fallback rules for non-planned activity to analyze both these affected PADS database objects, as well as their associated linked PADS database objects. This allows the system to attempt to determine what impact affected PADS database objects and linked PADS database objects have on various real world processes.

FIG. 10 shows a software flow chart showing how the system determines if various activities are either "planned" activities (e.g. expected with standard rules for exceptions already established) or "unplanned" (not expected, so the system will automatically analyze exceptions using fallback rules because when standard rules are not available). In some embodiments, the system may be configured to obtain such fallback rules by analyzing patterns of historical data (e.g. automatically determine what has happened in similar situations like this in the past) and use this historical data to estimate the impact of any unplanned deviations.

For either planned or unplanned activities, in some embodiments, the system may also use various impact analysis rules to analyze the real world process exceptions according to the object exception information (300.5), and link attribute data stored in their respective PADS database objects. This allows the system to automatically determine various consequences of the exception, and classify the impact of the exception on various real world processes in terms of urgency, magnitude of impact, and cost of inaction. The system can then output data pertaining to these consequences and impacts.

The system may use various algorithms to analyze the impact of various exceptions. Often some impacts may be so minor that reporting them may be not be useful, or even harmful because important impacts alerts could be lost in a sea of minor impact reports. To help ensure that trivial impacts are not overly reported, in some embodiments, the system may use algorithms that analyze the impact of the exception marked PADS database objects and linked PADS database objects on the status of at least some real world processes by using the linked attribute data in the exception marked PADS database objects, and any linked PADS database objects, to determine any potential real world process exceptions. The system can then use a "likely impact database" (this can have information pertaining to the likely impact that the exception marked PADS database objects will have on the corresponding potential real world process exceptions, and can be based on various criteria including impact rules, historical impact data, and historical impact patterns) to determine if the projected impact exceeds at least one threshold of significance. If so, then the impact can be reported as a real world process exception, and if not the impact may be ignored for reporting purposes.

Even among non-trivial impacts, some problems will be more important than others. To help distinguish among the importance of various reported impacts, in some embodiments, the system may use one or more thresholds of significance to also categorize a priority or severity of the real world process exception, and also output this priority or severity data as well. Such impact rules can be based on historical impact data, or (for business systems) historical impact patterns based on business process rules, business process historical data, business process historical patterns, and so on.

FIG. 11 shows a software flow chart showing a first example of the invention's exception analysis system in operation for a business process. Here someone in the sales organization has informed the system that a particular "thing" (product normally available for sale) has been put on delivery hold (perhaps the product in inventory was defective and needed to be replaced).

This "product hold could thus potentially impact the delivery dates for various customers, as well as other related processes.

In an important distinction over prior art OLTP methods, note that the management would probably not want to spend money advertising if a product is on hold pending a potential recall. Thus, in an ideal system, this product hold should automatically alert personnel in marketing that the product advertising schedule has been or should be also put on hold. According to the invention, if advertising actions and processes are incorporated into the invention's PADS database, then the system could automatically generate an advertising alert for that product.

FIG. 12 shows how, in this first example, the system can analyze the impact of placing a product on hold on subsequent (e.g. dependent) processes and activities. Here if the system determines that this hold is "planned", the system can use its standard expected value algorithms to determine the resulting impact. However if the system can't find standard rules, and determines that this "on hold" event was not "planned", and the impact of this exception can be analyzed using various fallback rules. Either way, the impact of placing the product on hold has on various downstream processes, such as various customer delivery dates, and even remote processes such as advertising, can be almost instantly calculated and reported by the system.

FIG. 13 shows a second example of the invention in operation. Here the system is handling the impact of bad weather on product shipments (e.g. from a supplier). In FIG. 13, the system is doing the initial data input and PADS object creation steps of the process.

FIG. 14 shows how, in this second example, the system then analyzes the impact of this supplier shipment delay on subsequent (e.g. dependent) processes and activities. As before, if the system determines that this shipment delay was "planned", the system can use its standard expected value algorithms to determine the resulting impact. However if the system can't find standard rules, and determines that this "shipment delay" was not "planned", and the impact of this delay can be analyzed using various fallback rules. Either way, the impact of the shipment delay on various subsequent business processes can be almost instantly calculated and reported by the system.

FIG. 15 shows a third example showing how the system can handle more complex OLAP or BI type problems, such as the problem of a supplier or vendor having chronic reliability or delinquency problems, using automatic data feeds from various external sources. Here the system can be configured to automatically receive business status information from an outside source, such as Dun & Bradstreet (D&B). The system can be configured so that the D&B status of all vendors are continually monitored on an automatic basis.

Here the system shows its value because it can automatically estimate the impact of an impending vendor failure on various products (things) or activities provided by that vendor, and hence on other dependent business processes. Here the data has been obtained from a business rating service provider (such as D&B), and the system is automatically linking this information, via the PADS database objects, to the various products or services provided by this problematic vendor.

FIG. 16 shows the continuing analysis of the third example previously discussed in FIG. 15. Since vendor failure is usually less likely than more routine problems of placing products on hold or bad weather, this third example is a good example of an unplanned activity. Here, for example, the system could use various fallback rules such as "analyze if vendor is experiencing a chapter 7 (vendor will likely cease operations) or chapter 11 (vendor will likely continue to operate) bankruptcy" and estimate the impact on various dependent processes accordingly.

FURTHER DISCUSSION

A key benefit of the present invention is its capability to define relatively complex and deep chains of processes that accurately depict how certain business activities in a real enterprise may span multiple business processes. Example: a sales order may be related in part to a procurement order, shipment and deliveries, accounts receivables, and so on. The system can determine the appropriate linkages to reproduce these processes, and thus accurately predict how exceptions can impact real world business processes, giving deep OALP type business intelligence at high (real time OLTP like) speeds.

Another benefit of the present invention is that its PADS database object type data model and architecture allows both activities to be monitored for their variance from the plan, as well as the downstream impact of exceptions on other activities, processes, and things to be monitored.

Another benefit of the present invention is that it uses historical data analysis and their impact on existing and future business objects to discover useful patterns that can subsequently be automatically used by the system to improve performance. For example: when a delivery on a purchase order for a particular raw material is delayed consistently, this affects the on time delivery (OTD) metric for the vendor or the material. The invention can make use of this historical data, and the previously discussed PADS database objects and methods, to use this historical data to predict, in real time, what impact present exceptions are likely to have on various business processes. This is possible because the invention's PADS database objects methods allow both online transaction processing (OLTP) and online Analytic processing (OLAP) data (used for business intelligence systems) to reside on the same database, thus allowing both types of analysis to be done on a real-time or near real-time basis.

The invention may be used for almost any type of real world based business process. This can include, but is not limited to, cases where the real world processes are business processes, and the real world things are products such as goods (for example as defined under the UCC uniform commerce code). The real world things can also include customers, vendors, raw materials, other types of materials, and finished goods. Business services may also be managed using this system as well.

Specific examples of various activities managed by the system can include putting products on hold, releasing products for delivery, shipping products, product sales, product returns, changing one or more raw materials to work-in-process goods or finished goods, creating purchase orders for products, creating purchase orders for raw materials for a product, delay in receiving products, delay in receiving raw materials for a product, and so on. Other real world activities can also include various shipment methods, various manufacturing steps of a manufacturing process, a distribution process, marketing activities, financial activities, real estate activities, personnel activities, regulatory activities, quality assurance activities, and the like.

Trademarks: SAP HANA® is the trademark of SAP AG.

The invention claimed is:

1. An automated method of using machine self-learning to detect and report exceptions to a plurality of real-world processes, said real world processes comprising a plurality of real-world things and/or real-world activities, and wherein at least some of said real-world things and/or activities are linked together to form real-world processes, said method comprising:

receiving, using at least one computer processor, raw data properties pertaining to said real-world things and activities, said raw data properties comprising when-where data, attribute data, identifier data, and quantity data associated with said real-world things and activities;

wherein at least some attribute data comprise link attribute data, and wherein at least some identifier data comprise thing-activity identifier data;

a) creating and storing, using said at least one computer processor, in real time as said raw data properties are received, said raw data properties, thing-activity identifier data and any link attribute data in a PADS database as PADS database objects, said PADS database objects comprising object header information and at least one set of when-where data, attribute data, thing-activity identifier data, quantity data and object exception information;

said PADS database objects being process agnostic objects that handle said raw data according to generic data models and machine self-learning software executed on said at least one computer processor;

wherein said object header information is received along with said raw data properties, or wherein said object header information is obtained by using said at least one computer processor to compare said raw data properties against a previously defined set of categories of real-world things and activities, and classifying said raw data according to said previously defined categories of real-world things and activities, thereby determining said object header information;

wherein said object exception information is obtained by using said at least one computer processor to compare said raw data properties against a previously defined baseline properties of said previously defined set of real-world things and activities to further determine if any of said raw data properties represent an exception from said baseline properties, and if said exception is found, storing it as object exception information;

wherein PADS database objects comprising at least one stored object exception information are exception marked PADS database objects;

linking, using said at least one computer processor, at least some different PADS database objects comprising data pertaining to real-world things and activities together to form real-world processes by setting said link attribute data in said different PADS database objects to create said links according to at least one set of process linking rules;

wherein PADS database objects linked together by setting said linked attribute data are linked PADS database objects;

b) further analyzing, using said at least one computer processor and at least one algorithm, said exception marked PADS database objects and linked PADS database objects and determining an impact of said exception marked PADS database objects and linked PADS database objects on a status of at least some of said real world processes, thereby determining real-world process exceptions;

and outputting, using said at least one computer processor, data pertaining to at least some of said real world process exceptions.

2. The method of claim 1, wherein at least some of said raw data properties are received from a human or automated user using a remote computerized device and a network connection;

wherein said remote computerized device has at least one remote processor;

wherein said at least one remote processor is configured to obtain said raw data properties from said user, and automatically link said raw data properties to said object header information;

thereby using said at least one remote processor and said network connection to receive raw data properties from said user along with said object header information.

3. The method of claim 1, wherein at least some of said raw data properties are received from a human or automated user using a remote computerized device and a network connection;

wherein said remote computerized device has at least one remote processor;

wherein said at least one remote processor is configured to obtain said raw data properties from said user, and automatically link said raw data properties to said thing-activity identifier data;

thereby using said at least one remote processor and said network connection to receive raw data properties from said user along with said thing-activity identifier data.

4. The method of claim 1, wherein using said at least one computer processor and at least one algorithm to analyze said exception marked PADS database objects and linked PADS database objects and determine an impact of said exception marked PADS database objects and linked PADS database objects on a status of at least some of said real world processes, thereby determining real-world process exceptions, is done either on a real-time basis as said data properties are received, or on a non-real time basis as determined by schedules set according to other criteria.

5. The method of claim 1, wherein a given PADS database object comprising data pertaining to real world activities is linked with zero or more different PADS database objects comprising data pertaining to real world things, and wherein said given PADS database object is also linked with zero or more different PADS database objects comprising data pertaining to different real world activities; and further using said at least one processor to alter at least some of said links according to at least one set of business process link configuration rules.

6. The method of claim 1, wherein said real-world processes are business processes, said real world things comprise products that are goods, and wherein said activities comprise activities selected from the group consisting of putting products on hold, releasing products for delivery, shipping products, product sales, product returns, changing one or more raw materials to work-in-process goods or finished goods, creating purchase orders for products, creating purchase orders for raw materials for a product, delay in receiving products, and delay in receiving raw materials for a product; or
wherein said real world things are selected from the group consisting of customers, vendors, raw materials, materials, and finished goods
or wherein said real world activities comprise various material movement & manufacturing steps of a manufacturing & distribution process, marketing activities, financial activities, real estate activities, personnel activities, regulatory activities, and quality assurance activities.

7. The method of claim 1, further analyzing, using said at least one computer processor, said machine self-learning software, and impact analysis rules, said real world process exceptions according to said object exception information, and said link attribute data, of their respective PADS database objects, thereby determining at least one of an urgency, magnitude of impact, and cost of inaction the impact of said exceptions on said real world processes, and outputting data pertaining to at least some of said real world process exceptions according to at least one of said urgency, magnitude of impact, and cost of inaction of said exceptions on said real world processes.

8. The method of claim 7, wherein said at least one algorithm analyzes the impact of said exception marked PADS database objects and linked PADS database objects on the status of at least some real world processes by:
using at least one processor and linked attribute data in said exception marked PADS database objects and linked PADS database object to determine any potential real world process exceptions;
using said at least one processor and a likely impact database comprising the likely impact that said exception marked PADS database objects will have on said potential real world process exceptions, determine if said exception marked PADS database objects have a projected impact on said potential real world process exceptions that exceeds at least one threshold of significance; and
if said likely impact exceeds said at least one threshold of significance, then categorize said potential real world process exception as a real world process exception and output data pertaining to said real world process exception.

9. The method of claim 8 wherein said projected impact exceeds said at least one threshold of significance, further using said at least one threshold of significance to also categorize a priority or severity of said real world process exception, and also output data pertaining to said priority or severity of said real world process exception.

10. The method of claim 8, wherein said likely impact database is based on said machine self-learning software executed on said at least one computer processor, and at least one of impact rules, historical impact data, or historical impact patterns.

11. The method of claim 10, wherein said impact rules, historical impact data, or historical impact patterns are business process rules, business process historical data, or business process historical patterns.

12. The method of claim 1, wherein said baseline properties further comprise computer data pertaining to object specific baseline properties of key dates, locations, and quantities;
wherein using said at least one computer processor to determine if any of said raw data properties represent an exception from said baseline properties comprises any of:
using the object header information and the object specific baseline properties of key dates to determine if said when-where data corresponds to said key dates; or
using the object header information, and said object specific baseline properties of said locations to determine if said when-where data corresponds to said locations; or
using the object header information, and said object specific baseline properties of said quantities to determine if said quantity data corresponds to said quantities;
and if one or more determinations find a lack of correspondence, then storing the lack of correspondence as at least one object exception information.

13. The method of claim 1, wherein if said raw data properties pertain to an activity, and if no previously defined baseline properties of said raw data properties are found, then using said at least one computer processor to further designate said activity as a non-planned activity;
marking the PADS database objects without said previously defined baseline properties as affected PADS database objects;
further using pre-defined rules for non-planned activity to analyze said affected PADS database objects and linked PADS database objects and to determine an impact of said affected PADS database and linked PADS database objects on a status of at least some of said real world processes, thereby determining real-world process exceptions.

14. The method of claim 1, wherein at said at least one computer processors are located on a computer network connected server, and wherein said method is performed on said computer network connected server.

15. The method of claim 1, wherein said PADS database and PADS database objects are configured to simultaneously handle both online transaction processing and online analytic processing.

16. An automated method of using machine self-learning to detect and report exceptions to a plurality of real-world processes, said real world processes comprising a plurality of real-world things and/or real-world activities, and wherein at least some of said real-world things and/or activities are linked together to form real-world processes, said method comprising:
receiving, using at least one computer processor, raw data properties pertaining to said real-world things and activities, said raw data properties comprising when-where data, attribute data, identifier data, and quantity data associated with said real-world things and activities;
wherein at least some attribute data comprise link attribute data, and wherein at least some identifier data comprise thing-activity identifier data;
a) creating and storing, using said at least one computer processor, in real time as said raw data properties are received, said raw data properties, thing-activity identifier data and any link attribute data in a PADS database as PADS database objects, said PADS database objects comprising object header information and at least one set of when-where data, attribute data, thing-activity identifier data, quantity data and object exception information;

said PADS database objects being process agnostic objects that handle said raw data according to generic data models and machine self-learning software executed on said at least one computer processor;

wherein said object header information is received along with said raw data properties, or wherein said object header information is obtained by using said at least one computer processor to compare said raw data properties against a previously defined set of categories of real-world things and activities, and classifying said raw data according to said previously defined categories of real-world things and activities, thereby determining said object header information;

wherein said object exception information is obtained by using said at least one computer processor to compare said raw data properties against a previously defined baseline properties of said previously defined set of real-world things and activities to further determine if any of said raw data properties represent an exception from said baseline properties, and if said exception is found, storing it as object exception information;

wherein PADS database objects comprising at least one stored object exception information are exception marked PADS database objects;

linking, using said at least one computer processor, at least some different PADS database objects comprising data pertaining to real-world things and activities together to form real-world processes by setting said link attribute data in said different PADS database objects to create said links according to at least one set of process linking rules;

wherein PADS database objects linked together by setting said linked attribute data are linked PADS database objects;

wherein a given PADS database object comprising data pertaining to real world activities is linked with zero or more different PADS database objects comprising data pertaining to real world things, and wherein said given PADS database object is also linked with zero or more different PADS database objects comprising data pertaining to different real world activities; and further using said at least one processor to alter at least some of said links according to at least one set of business process link configuration rules;

b) further analyzing, using said at least one computer processor and at least one algorithm, said exception marked PADS database objects and linked PADS database objects and determining an impact of said exception marked PADS database objects and linked PADS database objects on a status of at least some of said real world processes, thereby determining real-world process exceptions is done either on a real time basis as said data properties are received, or on a non-real time basis as determined by schedules set according to other criteria;

further analyzing, using said at least one computer processor, said machine self-learning software, and impact analysis rules, said real world process exceptions according to said object exception information, and said link attribute data, of their respective PADS database objects, thereby determining at least one of an urgency, magnitude of impact, and cost of inaction the impact of said exceptions on said real world processes; and outputting, using said at least one computer processor, data pertaining to at least some of said real world process exceptions according to at least one of said urgency, magnitude of impact, and cost of inaction of said exceptions on said real world processes.

17. The method of claim 16, wherein at least some of said raw data properties are received from a human or automated user using a remote computerized device and a network connection;

wherein said remote computerized device has at least one remote processor;

wherein said at least one remote processor is configured to obtain said raw data properties from said user, and automatically link said raw data properties to said object header information;

thereby using said at least one remote processor and said network connection to receive raw data properties from said user along with said object header information;

wherein at least some of said raw data properties are received from a human or automated user using a remote computerized device and a network connection;

wherein said remote computerized device has at least one remote processor;

wherein said at least one remote processor is configured to obtain said raw data properties from said user, and automatically link said raw data properties to said thing-activity identifier data;

thereby using said at least one remote processor and said network connection to receive raw data properties from said user along with said thing-activity identifier data.

18. The method of claim 16, wherein said PADS database and PADS database objects are configured to simultaneously handle both online transaction processing and online analytic processing, and wherein at said at least one computer processor are located on a computer network connected server, and wherein said method is performed on said computer network connected server.

19. A machine self-learning system for automatically detecting and reporting exceptions to a plurality of real-world processes, said real world processes comprising a plurality of real-world things and/or real-world activities, and wherein at least some of said real-world things and/or activities are linked together to form real-world processes, said system comprising:

at least one computer processor and memory;

PADS database object management software stored in said memory, said PADS database object management software configured to direct said at least one computer processor to receive raw data properties pertaining to said real-world things and activities, said raw data properties comprising when-where data, attribute data, identifier data, and quantity data associated with said real-world things and activities;

wherein at least some attribute data comprise link attribute data, and wherein at least some identifier data comprise thing-activity identifier data;

said PADS database object management software further configured to direct said at least one computer processor to create and store in said memory, in real-time as said raw data properties are received, said raw data properties, thing-activity identifier data and any link attribute data in a PADS database as PADS database objects, said PADS database objects comprising object header information and at least one set of when-where data, attribute data, thing-activity identifier data, quantity data and object exception information;

said PADS database objects being process agnostic objects that handle said raw data, according to generic data models and at least one computer processor configured to run machine self-learning software;

wherein said PADS database object management software is further configured to direct said at least one computer processor to receive said object header information along with said raw data properties, and/or wherein said PADS database object management software is further configured to direct said at least one computer processor to obtain said object header information by comparing said raw data properties against a previously defined set of categories of real-world things and activities, and to classify said raw data according to said previously defined categories of real-world things and activities, thereby determining said object header information;

wherein said PADS database object management software is further configured to direct said at least one computer processor to obtain said object exception information by comparing said raw data properties against a previously defined baseline properties of said previously defined set of real-world things and activities to further determine if any of said raw data properties represent an exception from said baseline properties, and if said exception is found, storing it as object exception information;

wherein PADS database objects comprising at least one stored object exception information are exception marked PADS database objects;

wherein said PADS database object management software is further configured to direct said at least one computer processor to link at least some different PADS database objects comprising data pertaining to real-world things and activities together to form real-world processes by setting said link attribute data in said different PADS database objects to create said links according to at least one set of process linking rules;

wherein PADS database objects linked together by setting said linked attribute data are linked PADS database objects.

20. The system of claim 19, wherein said PADS database object management software is further configured to direct said at least one computer processor configured to execute at least one algorithm to analyze said exception marked PADS database objects and linked PADS database objects and determine an impact of said exception marked PADS database objects and linked PADS database objects on a status of at least some of said real world processes, thereby determining real-world process exceptions;

and wherein said PADS database object management software is further configured to direct said at least one computer processor to output data pertaining to at least some of said real world process exceptions.

21. The method of claim 1, wherein said PADS database is a columnar database.

22. The method of claim 16, wherein said PADS database is a columnar database.

23. The system of claim 19, wherein said PADS database is a columnar database.

* * * * *